United States Patent
Gudumasu et al.

(10) Patent No.: US 12,456,252 B2
(45) Date of Patent: Oct. 28, 2025

(54) TILE TRACKS FOR GEOMETRY-BASED POINT CLOUD DATA

(71) Applicant: INTERDIGITAL VC HOLDINGS, INC., Wilmington (DE)

(72) Inventors: Srinivas Gudumasu, Montreal (CA); Ahmed Hamza, Coquitlam (CA)

(73) Assignee: INTERDIGITAL VC HOLDINGS, INC., Wilmington, DE (US)

(*) Notice: Subject to any disclaimer, the term of this patent is extended or adjusted under 35 U.S.C. 154(b) by 292 days.

(21) Appl. No.: 18/017,989

(22) PCT Filed: Aug. 6, 2021

(86) PCT No.: PCT/US2021/045051
§ 371 (c)(1),
(2) Date: Jan. 25, 2023

(87) PCT Pub. No.: WO2022/032161
PCT Pub. Date: Feb. 10, 2022

(65) Prior Publication Data
US 2023/0281923 A1    Sep. 7, 2023

Related U.S. Application Data

(60) Provisional application No. 63/217,638, filed on Jul. 1, 2021, provisional application No. 63/160,223, filed (Continued)

(51) Int. Cl.
| | | |
|---|---|---|
| G06T 17/00 | (2006.01) | |
| G06V 10/25 | (2022.01) | |
| H04N 19/597 | (2014.01) | |

(52) U.S. Cl.
CPC .............. *G06T 17/00* (2013.01); *G06V 10/25* (2022.01); *H04N 19/597* (2014.11)

(58) Field of Classification Search
CPC ...... G06T 17/00; G06V 10/25; H04N 19/597; H04N 21/21805; H04N 21/44012; H04N 21/816; H04N 21/8146
See application file for complete search history.

(56) References Cited

U.S. PATENT DOCUMENTS

11,631,158 B2 * 4/2023 Lee .................... G06T 9/001
382/100
2019/0318488 A1 10/2019 Lim
(Continued)

FOREIGN PATENT DOCUMENTS

| CN | 105359189 A | 2/2016 |
| CN | 106233745 A | 12/2016 |

(Continued)

OTHER PUBLICATIONS

International Search Report and Written Opinion of the International Searching Authority for PCT/US2021/045051 mailed Oct. 7, 2021 (10 pages).
(Continued)

*Primary Examiner* — Chong Wu
(74) *Attorney, Agent, or Firm* — Klintworth & Rozenblat LLP

(57) ABSTRACT

A method and apparatus include receiving a timed-metadata track identifying point cloud tiles corresponding to one or more spatial regions within a point cloud scene. A decoding device determines one or more point cloud tiles to be used for rendering an image. One or more geometry tile tracks are retrieved, via a communications network, corresponding to the determined one or more point cloud tiles. Each geometry tile track comprises point cloud geometry data for a respective tile. The retrieved geometry tile tracks are processed.

16 Claims, 15 Drawing Sheets

Related U.S. Application Data on Mar. 12, 2021, provisional application No. 63/087,683, filed on Oct. 5, 2020, provisional application No. 63/063,167, filed on Aug. 7, 2020.

(56) References Cited

U.S. PATENT DOCUMENTS

| | | |
|---|---|---|
| 2020/0153885 A1 | 5/2020 | Lee |
| 2020/0226792 A1 | 7/2020 | Wang |
| 2022/0036593 A1 | 2/2022 | Takahashi |
| 2023/0222693 A1* | 7/2023 | Takahashi ............ H04N 21/816 345/419 |

FOREIGN PATENT DOCUMENTS

| | | | |
|---|---|---|---|
| WO | 2020070379 | A1 | 4/2020 |
| WO | 2020101021 | A1 | 5/2020 |
| WO | 2020137642 | A1 | 7/2020 |

OTHER PUBLICATIONS

Aksu, E. B., "Technologies Under Consideration for Carriage of Point Cloud Data", International Organisation for Standardisation Organisation Internationale De Normalisation ISO/IEC JTC1/SC29/WG 11 Coding of Moving Pictures and AudioISO/IEC JTC1/SC29/WG11 MPEG2018/N18414, Geneva, CH, Mar. 2019 (40 pages).
International Preliminary Report on Patentability PCT/US2021/045051 issued Feb. 7, 2023 (7 pages).
Tulvan, C. et al., "Use Cases for Point Cloud Compression (PCC)" International Organisation for Standardisation Organisation Internationale De Normalisation ISO/IEC JTC1/SC29/WG11 Coding of Moving Pictures and Audio, ISO/IEC JTC1/SC29/WG11 MPEG2015/N16331, Geneva, CH , Jun. 2016 (8 pages).
"G-PCC Future Enhancements" Information Technology—MPEG-I (Coded Representation of Immersive Media)—Part 9: Geometry-based Point Cloud Compression International Organisation for Standardisation Organisation Internationale De Normalisation ISO/IEC JTC 1/SC 29/WG 11 Coding of Moving Pictures and Audio N19328, ISO/IEC 23090-9:2020(E) 2020 (147 pages).
International Standard, "Information Technology—Coding of Audiovisual Objects Part 12: ISO Base Media File Format". ISO/IEC 14496-12, fifth edition, Feb. 20, 2015, (256 pages).
Oh, S. et al., "WD of ISO/IEC 23090-18 Carriage of Geometry-based Point Cloud Compression Data" International Organisation for Standardisation Organisation Internationale De Normalisation ISO/IEC JTC 1/SC 29/WG 11 Coding of Moving Pictures and Audio N19286, Apr. 2020 (23 pages).
Oh, S. et al.,"Text of ISO/IEC DIS 23090-18 Carriage of Geometry-based Point Cloud Compression Data" International Organization for Standardization Organisation Internationale De Normalisation, ISO/IEC JTC 1/SC 29/WG 03 N0075, Oct. 2020 (48 pages).
International Search Report and Written Opinion of the International Searching Authority for PCT/US2021/045051 mailed Feb. 23, 2022 (10 pages).
Graziosi, D. et al., "An overview of ongoing point cloud compression standardization activities: Video-based (V-PCC) and geometry-based (G-PCC)." APSIPA Transactions on Signal and Information Processing vol. 9, e13, 2020 (17 pages).
Oh, S. et al.," Harmonized Approach for Carriage of G-PCC Tiles" International Organisation for Standardisation Organisation Internationale De Normalisation ISO/IEC JTC1/SC29/WG3 Coding of Moving Pictures and Audio m55566, Oct. 2020 (5 pages).
Gudumasu, S. et al.,"[PCC Systems] G-PCC Tile Tracks for Partial Access Support in MPEG-I Part 18" International Organisation for Standardisation Organisation Internationale De Normalisation ISO/IEC JTC1/SC29/WG11 Coding of Moving Pictures and Audio ISO/IEC JTC1/SC29/ WG3 m54854, Oct. 2020 (5 pages).
Gudumasu, S. et al.,"On G-PCC Tile Tracks and Partial Access in MPEG-I Part 18" International Organisation for Standardisation Organisation Internationale De Normalisation ISO/IEC JTC1/SC29/WG3 Coding of Moving Pictures and Audio m54954, Oct. 2020 (7 pages).
Takahashi, R. et al.,"Improvements on partial access of G-PCC data" International Organisation for Standardisation Organisation Internationale De Normalisation ISO/IEC JTC 1/SC 29/WG 3 Coding of Moving Pictures and Audio m55927v3, Jan. 2021 (6 pages).
Gudumasu, S. et al.,"On partial access of non-timed G-PCC data in MPEG-I Part 18" International Organisation for Standardisation Organisation Internationale De Normalisation ISO/IEC JTC 1/SC 29/WG 3 Coding of Moving Pictures and Audio m56344, Apr. 2021 (5 pages).
Oh, S. et al., "Potential Improvement of ISO/IEC 23090-18 Carriage of Geometry based Point Cloud Compression Data" International Organization for Standardization Organisation Internationale De Normalisation ISO/IEC JTC 1/SC 29/WG 03 MPEG Systems ISO/IEC JTC 1/SC 29/WG 03 N0141, May 2021 (51 pages).

* cited by examiner

-PRIOR ART-

-PRIOR ART-

-PRIOR ART-

TILE TRACKS FOR GEOMETRY-BASED POINT CLOUD DATA

CROSS-REFERENCE TO RELATED APPLICATIONS

The present application is a national stage application under 35 U.S.C. § 371 of International Application PCT/US2021/045051, filed Aug. 6, 2021, which was published in accordance with PCT Article 21 (2) on Feb. 10, 2022, in English, which is hereby incorporated by reference in its entirety, and which is a non-provisional filing of, and claims benefit under 35 U.S.C. § 119 (e) from, U.S. Provisional Patent Application Ser. No. 63/063,167, titled "Tile Tracks for Geometry-Based Point Cloud Data," filed Aug. 7, 2020, which is hereby incorporated by reference in its entirety; and is a non-provisional filing of, and claims benefit under 35 U.S.C. § 119 (e) from, U.S. Provisional Patent Application Ser. No. 63/087,683, titled "Tile Tracks for Geometry-Based Point Cloud Data," filed Oct. 5, 2020, which is hereby incorporated by reference in its entirety; and is a non-provisional filing of, and claims benefit under 35 U.S.C. § 119 (e) from, U.S. Provisional Patent Application Ser. No. 63/160,223, titled "Tile Tracks for Geometry-Based Point Cloud Data," filed Mar. 12, 2021, which is hereby incorporated by reference in its entirety; and is a non-provisional filing of, and claims benefit under 35 U.S.C. § 119 (e) from, U.S. Provisional Patent Application Ser. No. 63/217,638, titled "Tile Tracks for Geometry-Based Point Cloud Data," filed Jul. 1, 2021, which is hereby incorporated by reference in its entirety.

BACKGROUND

High-quality 3D point clouds have recently emerged as an advanced representation of immersive media. A point cloud consists of a set of points represented in the 3D space using coordinates indicating the location of each point along with one or more attributes, such as the color associated with each point, transparency, reflectance of laser or material property, and so forth. Point clouds may be captured in a number of ways. For example, one technique for capturing point clouds uses multiple cameras and depth sensors. Light Detection and Ranging (LiDAR) laser scanners are also commonly used for capturing point clouds. The number of points required in order to realistically reconstruct objects and scenes using point clouds is in the order of millions (or even billions). Therefore, efficient representation and compression is essential for storing and transmitting point cloud data.

Recent advances of technologies in capturing and rendering 3D points have realized novel applications in the areas of tele-presence, virtual reality, and large-scale dynamic 3D maps (N16331, "Use Cases for Point Cloud Compression (PCC)," MPEG 115, June 2016). The 3D Graphics subgroup of ISO/IEC JTC1/SC29/WG11 Moving Picture Experts Group (MPEG) is currently working on the development of two 3D point cloud compression (PCC) standards: a geometry-based compression standard for static point clouds and a video-based compression standard for dynamic point clouds. The goal of these standards is to support efficient and interoperable storage and transmission of 3D point clouds. Among the requirements of these standards is to support lossy and/or lossless coding of point cloud geometry coordinates and attributes.

New media, such as virtual reality and immersive three-dimensional (3D) graphics, have generated substantial interest. High-quality 3D point clouds recently emerged as an advanced representation of immersive media, enabling new forms of interaction and communication with virtual worlds. The large volume of information required to represent such point clouds requires efficient coding algorithms. The 3DG workgroup of MPEG is currently developing the ISO/IEC 23090-9 standard for geometry-based compression of point clouds (N19328, "Text of ISO/IEC DIS 23090-9 Geometry-based Point Cloud Compression," MPEG 131, July 2020). Work on another standard ISO/IEC 23090-18 for carriage of G-PCC data ("WD of ISO/IEC 23090-18 Carriage of Geometry-based Point Cloud Compression Data," MPEG 130, April 2020) is ongoing and is in the working draft (WD) stage.

A recent draft of the ISO/IEC WD 23090-18 only supports carrying geometry-based point cloud compression (G-PCC data) in a single track or in multiple tracks with each track carrying G-PCC component data. This type of support is a problem in streaming applications that are forced to download and decode all G-PCC component information even when the user is interested only in certain regions/objects in the G-PCC content. A recent DIS version of the ISO/IEC 23090-18 (N00075, "Text of ISO/IEC DIS 23090-18 Carriage of Geometry-based Point Cloud Compression Data," MPEG 132, October 2020) supports carriage of non-timed G-PCC data but does not provide efficient partial access support of non-timed G-PCC data.

A number of methods to overcome the aforementioned shortcomings are described.

SUMMARY

A method and apparatus include receiving a timed-metadata track identifying point cloud tiles corresponding to one or more spatial regions within a point cloud scene. A decoding device determines one or more point cloud tiles to be used for rendering an image. One or more geometry tile tracks are retrieved, via a communications network, corresponding to the determined one or more point cloud tiles. Each geometry tile track comprises point cloud geometry data for a respective tile. The retrieved geometry tile tracks are processed.

BRIEF DESCRIPTION OF THE DRAWINGS

Like reference numerals in the figures indicate like elements, wherein:

FIG. 10 is a diagram showing track alternatives and groupings for storage of G-PCC content according to an embodiment.

EXAMPLE SYSTEMS FOR IMPLEMENTATION OF THE EMBODIMENTS

Figure 1A:
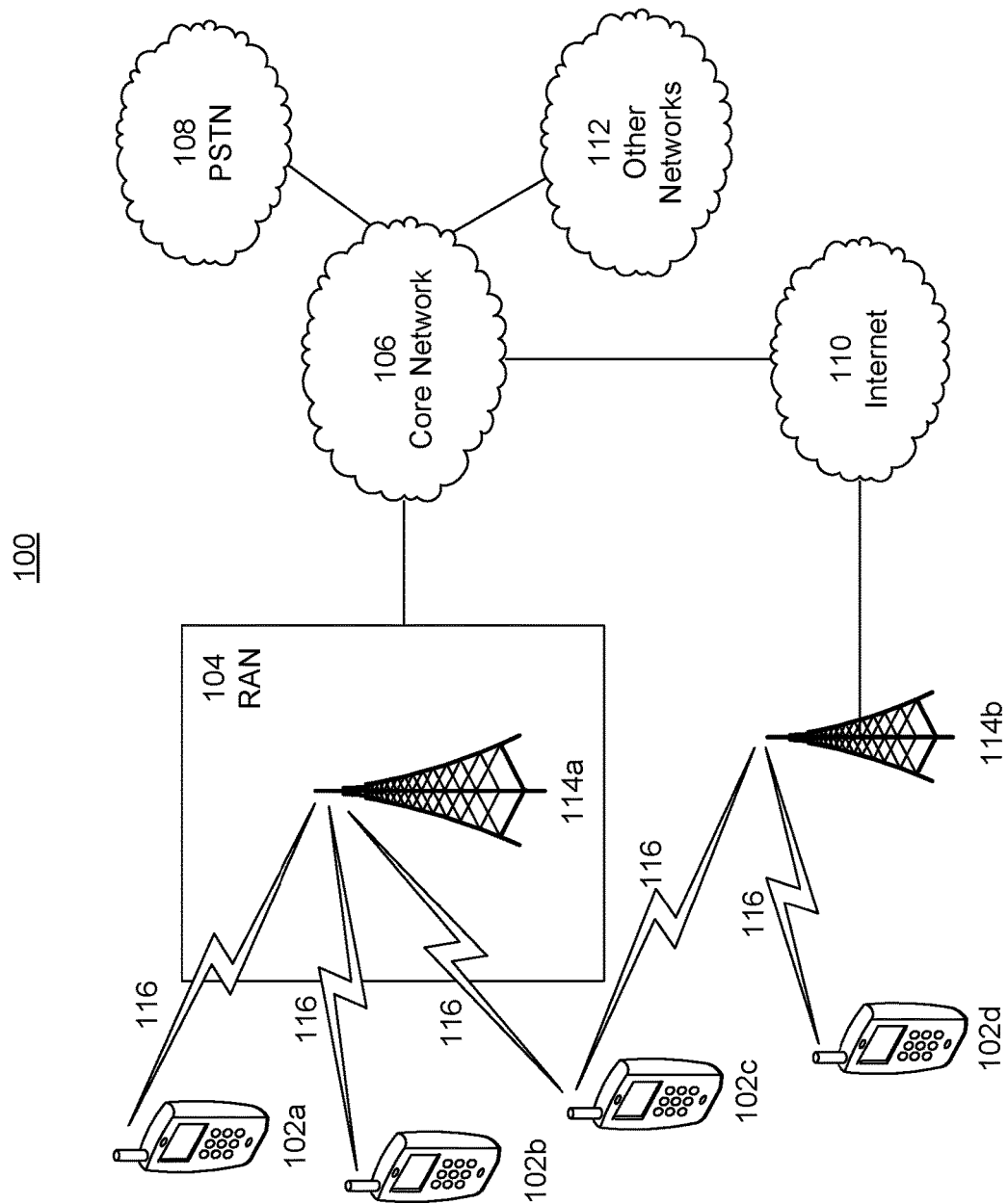
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
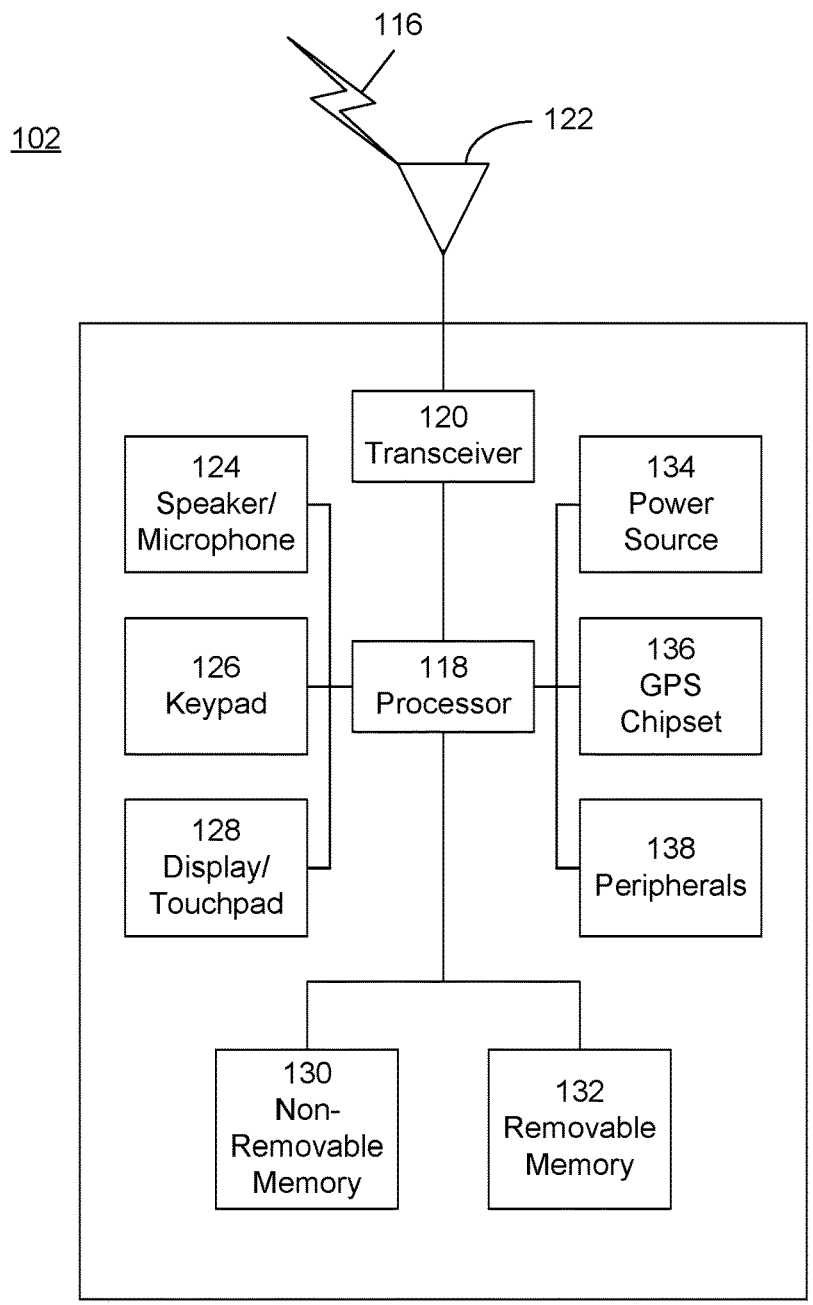
FIG. 1B is a system diagram illustrating an example wireless transmit/receive unit (WTRU) that may be used within the communications system illustrated in FIG. 1A according to an embodiment.
Figure 1C:
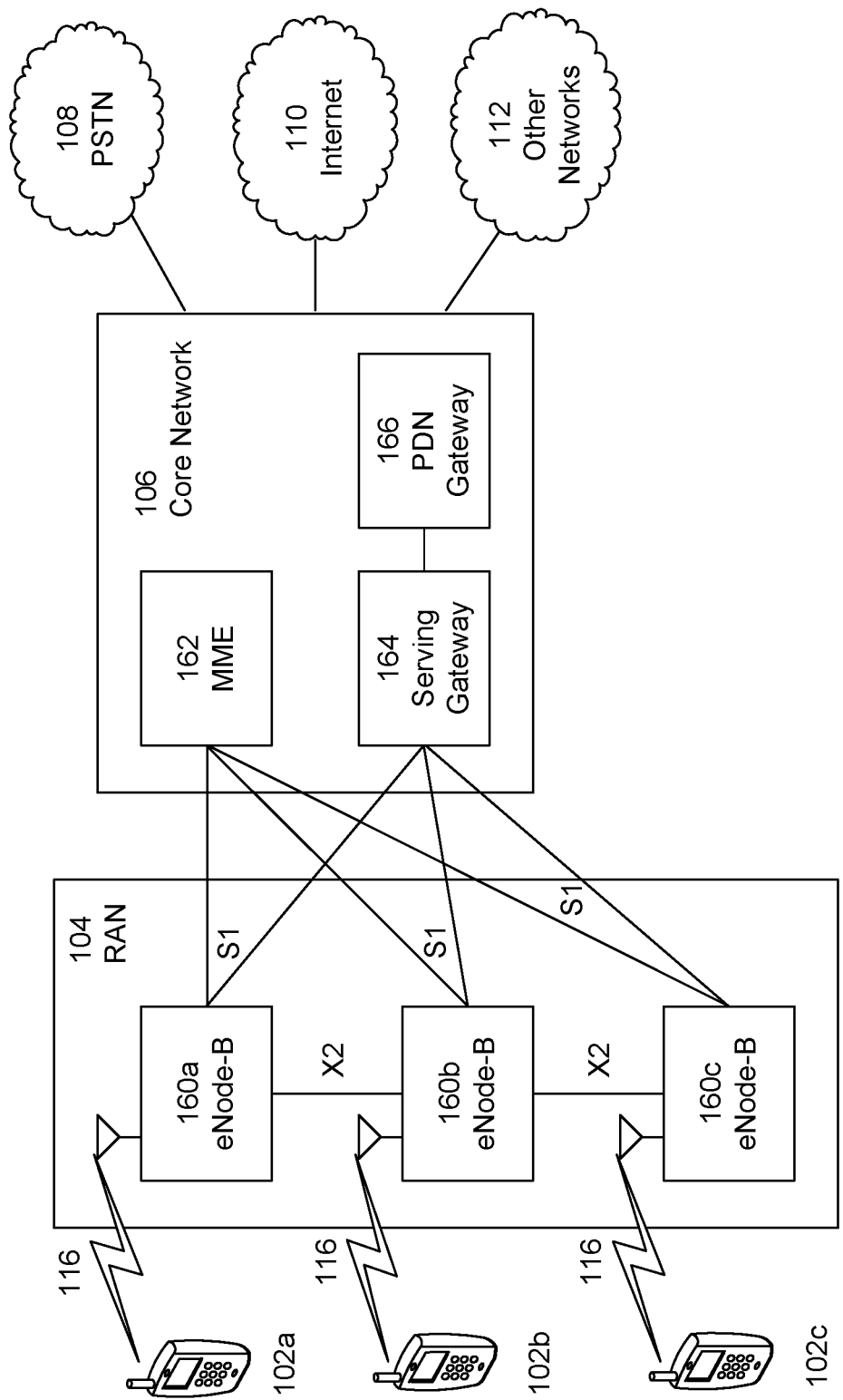
FIG. 1D is a system diagram illustrating a further example RAN and a further example CN that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 10:
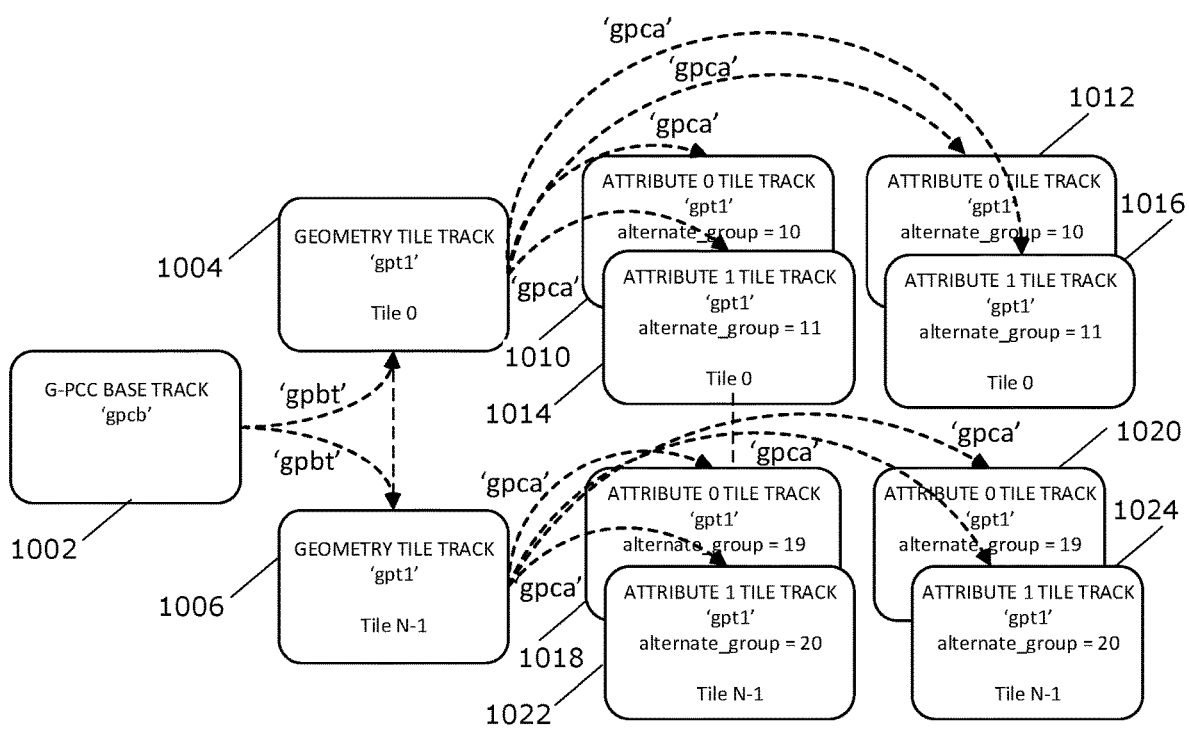
FIG. 10 is a system diagram illustrating an example radio access network (RAN) and an example core network (CN) that may be used within the communications system illustrated in FIG. 1A according to an embodiment.

FIG. 10 is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 10, the eNode-Bs 160*a*, 160*b*, 160*c* may communicate with one another over an X2 interface.

The CN 106 shown in FIG. 10 may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
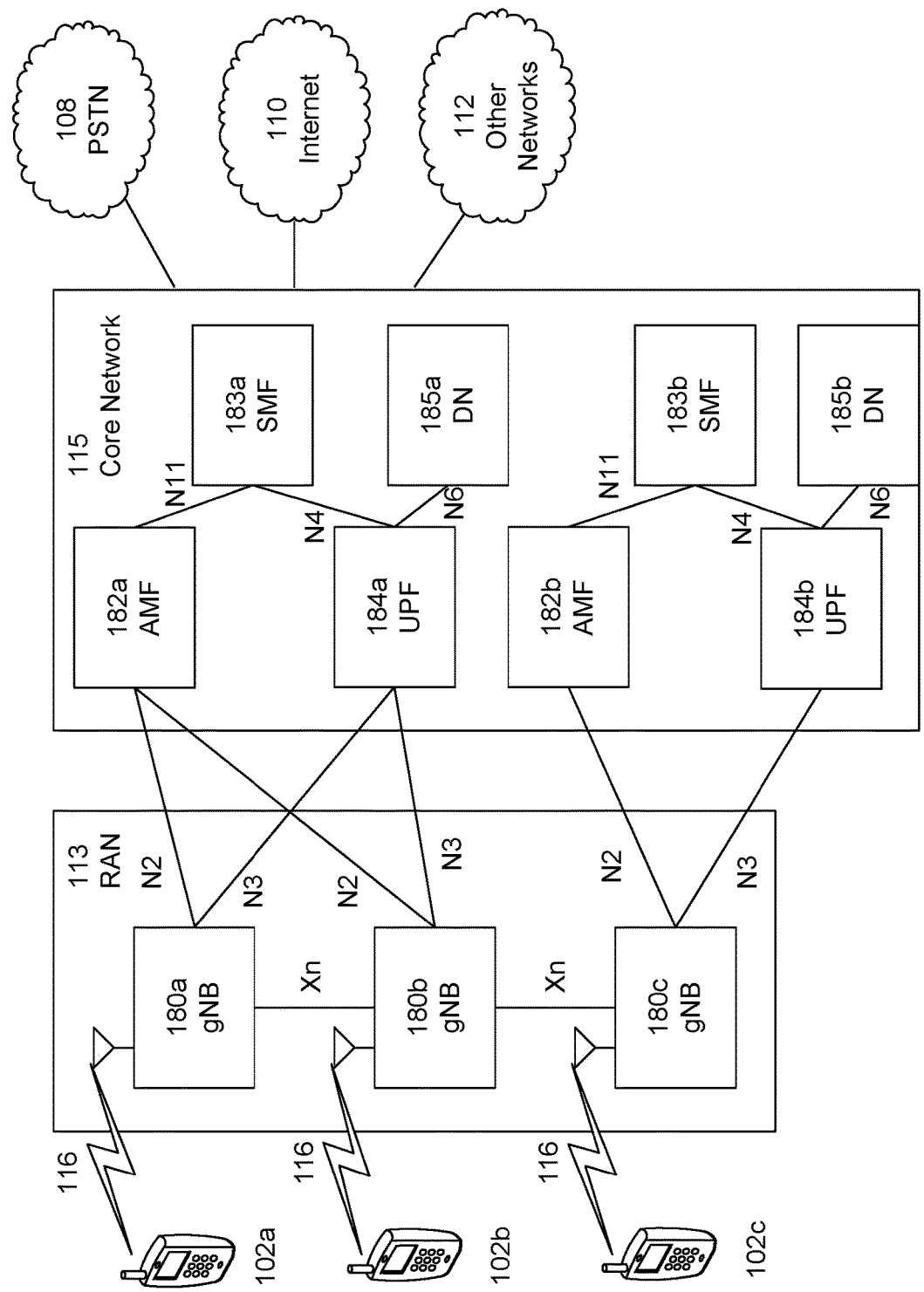

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Figure 2:
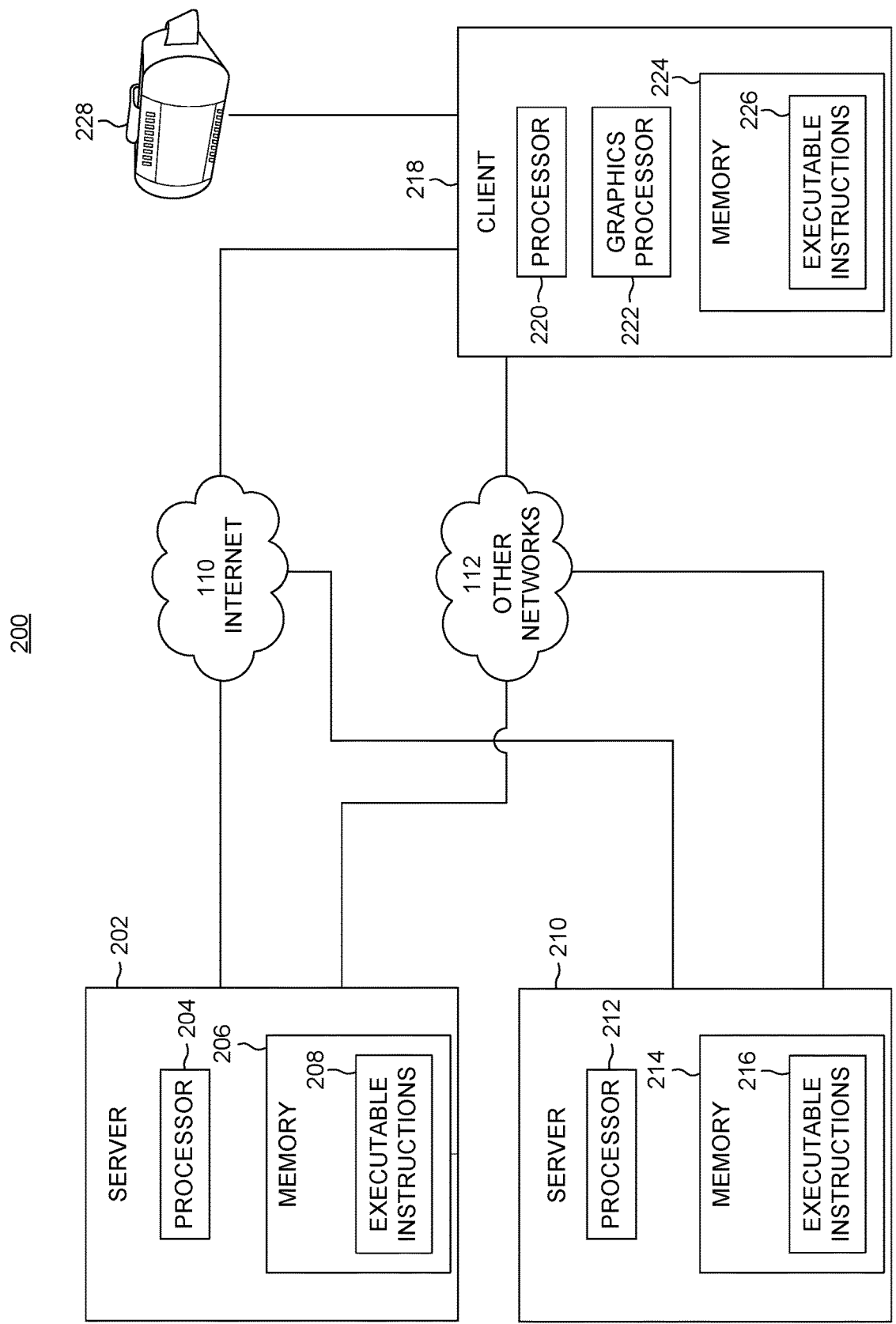
FIG. 2 is a system interface diagram illustrating an example set of interfaces for two servers and a client according to some embodiments.

FIG. 2 is a system interface diagram illustrating an example set of interfaces for two servers and a client according to some embodiments. According to the example, one server 202 may be a point cloud server, and the other server 210 may be a neural network server. In some embodiments, the servers may coincide. Both servers are connected to the internet 110 and other networks 112. A client 218 is also connected to the internet 110 and other networks 112, enabling communication among all three nodes 202, 210, 218. Each node 202, 210, 218 comprises a processor 204, 212, 220, a non-transitory computer readable memory storage medium 206, 214, 224, and executable instructions 208, 216, 226 contained within the storage medium 206, 214, 224, which instructions are executable by the processor 204, 212, 220 to carry out methods or portions of methods disclosed herein. As illustrated, the client may include for some embodiments a graphics processor 222 for rendering 3D video for a display, such as a head mounted display (HMD) 228. Any or all of the nodes may comprise a WTRU and communicate over the networks, as described above with respect to FIG. 1A and FIG. 1B.

For some embodiments, a system 200 may include a point cloud server 202, a neural network server 210, and/or a client 218 that includes one or more processors 204, 212, 220 and one or more non-transitory computer-readable mediums 206, 214, 224 storing instructions 208, 216, 226 that are operative, when executed by the processor 204, 212, 220, to perform a method disclosed herein. For some embodiments, a node 218 may include one or more graphics processors 222. For some embodiments, a node 202, 210, 218 may include one or more sensors.

Figure 3A:
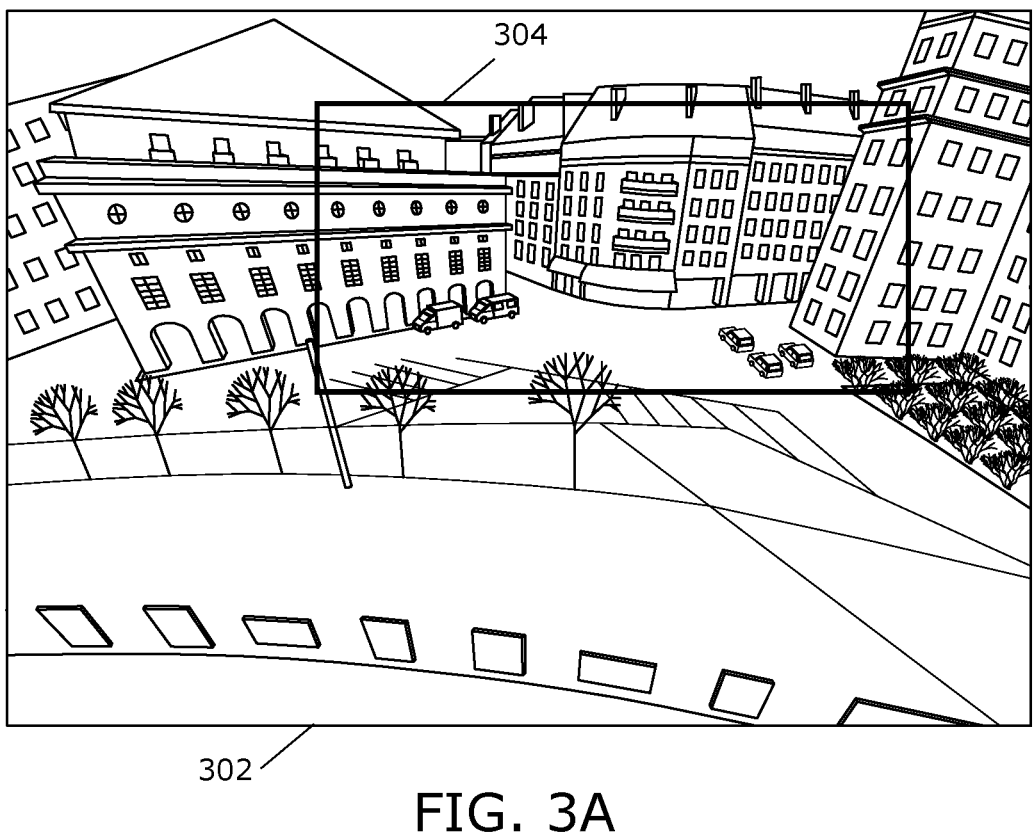
FIG. 3A is an example point cloud of a scene or image that may be captured and processed by some embodiments.

FIG. 3A shows an example point cloud of a scene or image that may be captured and processed by some embodiments. The scene 302 includes multiple buildings at a distance and some closer objects, imaged from an observer viewpoint with some apparent height. As an observer viewpoint changes, such as by moving lower or closer to the buildings, the relative angles to the points within the point cloud may change. Point clouds may be detected in real-world scenes, generated with virtual objects, or any combination of these or other techniques as applicable. A region 304 may include one or more tiles.

Figure 3B:
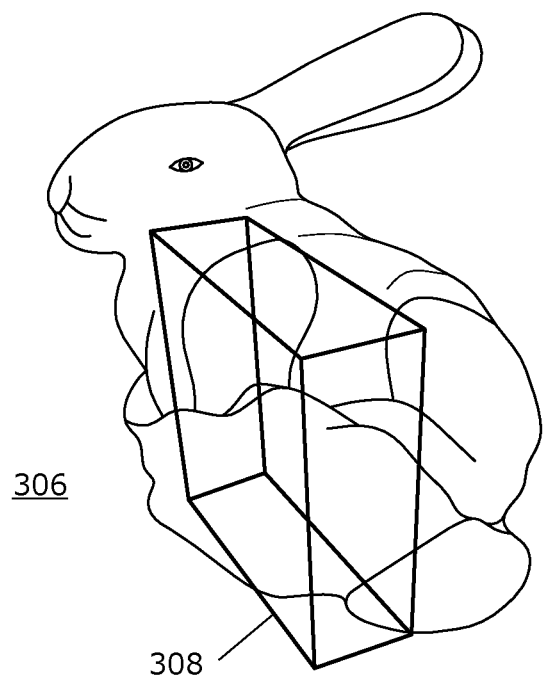
FIG. 3B shows an example point cloud of an object or image that may be captured and processed by some embodiments.

FIG. 3B shows an example point cloud of an object or image that may be captured and processed by some embodiments. FIG. 3B is a two-dimensional black and white line drawing of a three-dimensional point cloud object 306. Within a three-dimensional display environment, a point cloud object has points that represent three-dimensional coordinates in which a portion of an object has been detected to exist. Such detection may occur using, e.g., 3D sensors, such as light detection and ranging (LIDAR), stereo video, and RGB-D cameras. The point cloud data may include, e.g., 3D location and radiance image data or voxels.

DETAILED DESCRIPTION

A number of methods to overcome the aforementioned shortcomings are described. Signaling methods that enable flexible partial access to different parts of a coded point cloud sequence encapsulated, for example, in an ISOBMFF container are provided. Also described are ways to provide efficient partial access of non-timed G-PCC data carried in ISOBMFF file.

Figure 4:
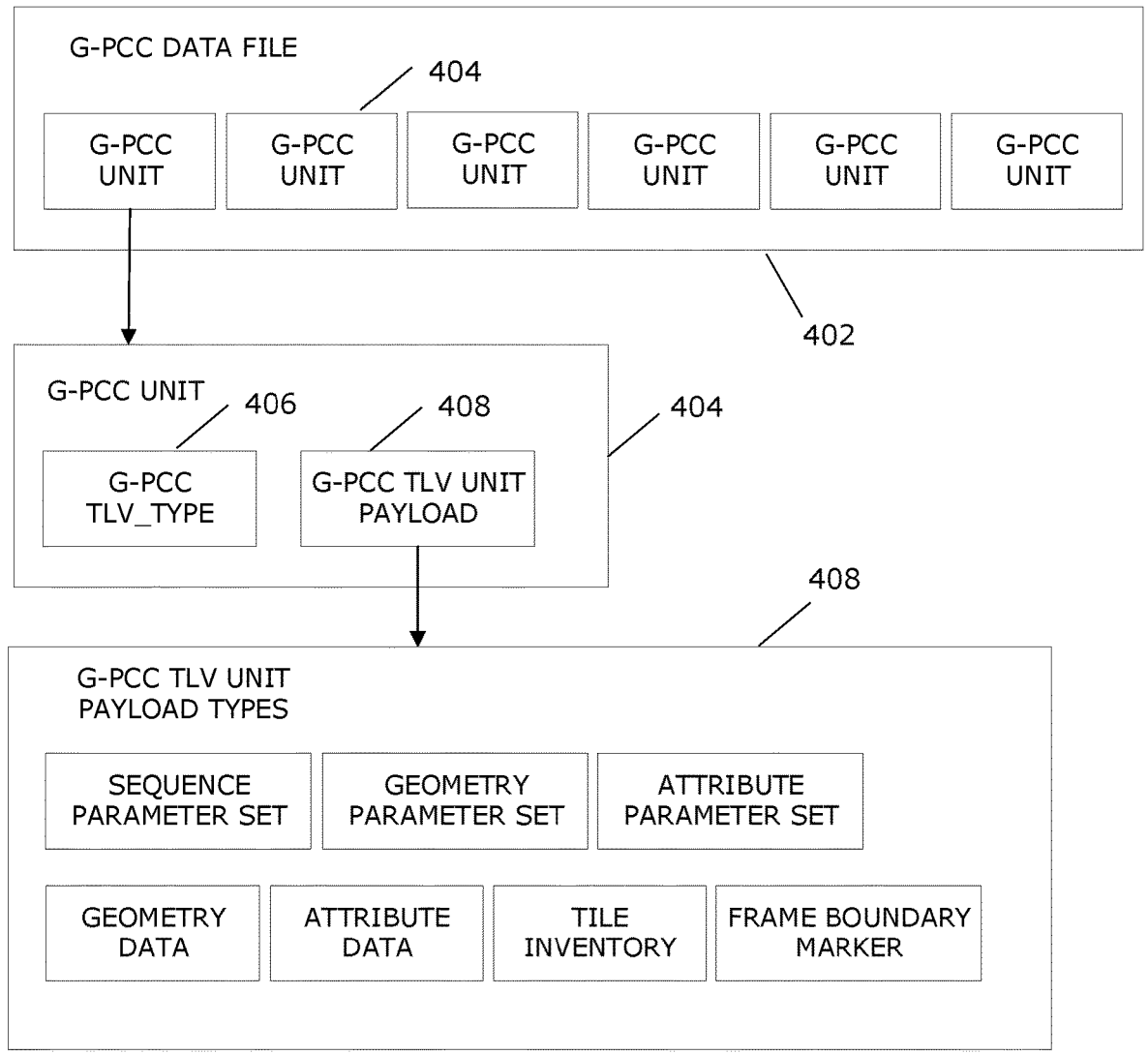
FIG. 4 is a geometry-based point cloud compression data file structure.

FIG. 4 illustrates the structure of the data file for the geometry-based point cloud compression (G-PCC). In a recent draft of international standard (DIS) version of ISO/IEC 23090-9 (N19328, "Text of ISO/IEC DIS 23090-9 Geometry-based Point Cloud Compression," MPEG 131, July 2020), the G-PCC data file 402 comprises a set of G-PCC units 404 also known as type-length-value (TLV) encapsulation structures as shown in FIG. 4. The syntax of a G-PCC TLV unit 404 as described in a recent version of the G-PCC standard's DIS draft is given in Table 1, where each G-PCC TLV unit 404 has a G-PCC TLV type 406, G-PCC TLV unit payload length, and a G-PCC TLV unit payload 408. Examples of G-PCC TLV unit payloads 408 include a sequence parameter set, a geometry parameter set, an attribute parameter set, geometry data, attribute data, and a frame boundary marker. The tlv_type and associated G-PCC data unit description are shown in Table 2. G-PCC TLV units 104 with unit types 2 and 4 are geometry and attribute data units, such as defined in ISO/IEC 23090-9. These data units represent the two main components needed for reconstructing a point cloud. The payload of geometry and attribute G-PCC units correspond to media data units, e.g., TLV units, that could be decoded by the G-PCC decoder specified in the corresponding geometry and attribute parameter set G-PCC unit.

TABLE 1

|  | Descriptor |
|---|---|
| tlv_encapsulation( ) { |  |
|   tlv_type | u(8) |
|   tlv_num_payload_bytes | u(32) |
|   for( i = 0; i < tlv_num_payload_bytes; i++ ) |  |
|     tlv_payload_byte[ i ] | u(8) |
| } |  |

TABLE 2

| tlv_type | Description |
|---|---|
| 0 | Sequence parameter set |
| 1 | Geometry parameter set |
| 2 | Geometry data unit |
| 3 | Attribute parameter set |
| 4 | Attribute data unit |
| 5 | Tile inventory |
| 6 | Frame boundary marker |
| 7 | Defaulted attribute data unit |

G-PCC attribute types by known_attribute_label are shown in Table 3.

TABLE 3

| known_attribute_label | Attribute type |
|---|---|
| 0 | Colour |
| 1 | Reflectance |
| 2 | Frame index |
| 3 | Material ID |
| 4 | Transparency |
| 5 | Normals |

G-PCC attribute types by known_attribute_label are shown in Table 4.

TABLE 4

```
tlv_payload( ) {
  if( tlv_type == GPCC_SPS )
    sequence_parameter_set( )
  else if( tlv_type == GPCC_GPS )
    geometry_parameter_set( )
  else if(tlv_type == GPCC_APS )
    attribute_parameter_set ( )
  else if(tlv_type == GPCC_GD )
    geometry_data_unit ( ) {
      geometry_data_unit_header( )
      geometry_data_unit_data( )
      geometry_data_unit_footer( )
    }
}
```

TABLE 4-continued

```
  else if(tlv_type == GPCC_AD )
    attribute_data_unit ( ) {
      attribute_data_unit_header( )
      attribute_data_unit_data( )
    }
}
```

The G-PCC file high-level syntax (HLS) supports the notion of slice and tile groups in geometry and attribute data. A frame is partitioned into multiple tiles and slices. A slice is a set of points that can be encoded or decoded independently. A slice comprises one geometry data unit and zero or more attribute data units. Attribute data units depend upon the corresponding geometry data unit within the same slice. Within a slice, the geometry data unit appears before any associated attribute units. The data units of a slice are advantageously contiguous. The ordering of slices within a frame is unspecified.

A group of slices may be identified by a common tile identifier. The ISO/IEC 23090-9 specification provides a tile inventory that describes a bounding box for each tile. A tile may overlap another tile in the bounding box. Each slice contains an index that identifies the tile to which the slice belongs.

The ISO/IEC 14496 (MPEG-4) standard includes several parts that define file formats for the storage of time-based media. These formats are based on and derived from the ISO Base Media File Format (ISOBMFF), which has a structural, media-independent definition. ISOBMFF contains structural and media data information that may be utilized for timed presentations of media data such as audio, video, and so forth. Support is also provided for un-timed data, such as meta-data at different levels within the file structure. The logical structure of the file is a movie structure that contains a set of time-parallel tracks. The time structure of the file includes tracks that contain sequences of samples in time, and those sequences are mapped into the timeline of the overall movie. ISOBMFF is based in the concept of box-structured files. A box-structured file consists of a series of boxes, sometimes called atoms, which have a size and a type. The types are 32-bit values and are usually chosen to be four-printable characters, also known as four-character code (4CC). Un-timed data may be contained in a metadata box, at the file level, or attached to the movie box or one of the streams of timed data, called tracks, within the movie.

Figure 6:
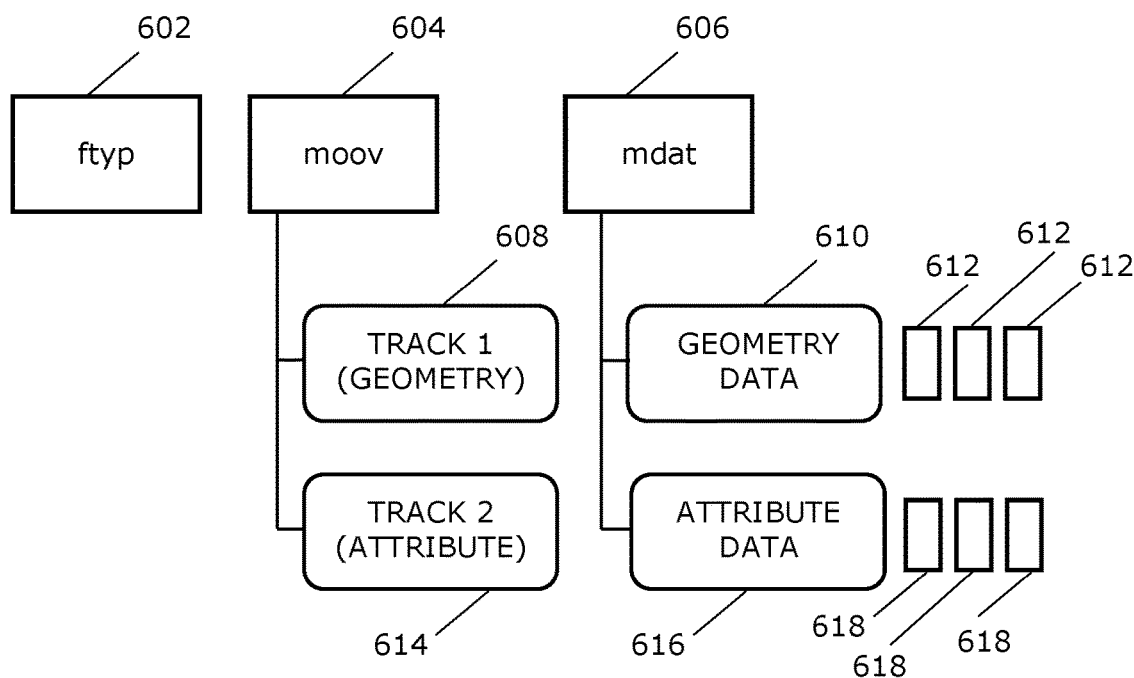
FIG. 6 is a multi-track G-PCC data file container structure.

A multi-track G-PCC data file container structure according to an embodiment is shown in FIG. 6. The ftyp top-level box 602 identifies which specification is the 'best use' of the container, also referred to as a file, and a minor version of that specification, as well as a set of other specifications to which the file complies.

Among the top-level boxes within an ISOBMFF container is the MovieBox ('moov') 604 that contains metadata for the continuous media streams present in the container or file. These metadata are signaled within the hierarchy of boxes in the Movie box, e.g., within the TrackBox ('trak'). A track represents a continuous media stream that is present in the file. The media stream itself consists of a sequence of samples, such as audio or video units of an elementary media stream and are enclosed within a MediaDataBox ('mdat') 606 that is present at the top-level of the container. The metadata for each track includes a list of sample description entries, each providing the coding or encapsulation format used in the track and the initialization data for processing that format. Each sample is associated with one of the sample description entries of the track. ISO/IEC 14496-12 provides a tool for defining an explicit timeline map for each track. This tool is known as an edit list and is signalled using an EditListBox with the following syntax, where each entry sets forth part of the track time-line by mapping part of the composition timeline or by indicating 'empty' time, for example, portions of the presentation timeline that map to no media, also known as an 'empty' edit. For example:

```
aligned(8) class EditListBox extends FullBox('elst', version, flags) {
    unsigned int(32) entry_count;
    for (i=1; i <= entry_count; i++) {
        if (version == 1) {
            unsigned int(64) edit_duration;
            int(64) media_time;
        } else { // version==0
            unsigned int(32) edit_duration;
            int(32) media_time;
        }
        int(16) media_rate_integer;
        int(16) media_rate_fraction = 0;
    }
}
```

A point cloud sequence may represent a scene with multiple tiles. In many applications, accessing individual tiles without having to decode other parts of the scene is desirable, for example, to stream and/or render data. Similarly, the point cloud may represent a single object, and a user may desire to access certain parts of the object without decoding the entire point cloud.

Figure 5:
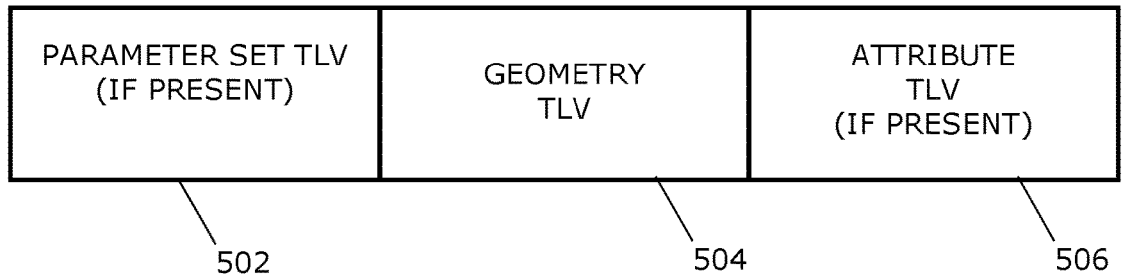
FIG. 5 is an example structure of a coded G-PCC data file stored in a single track.

When the G-PCC data file is carried in a single track, the G-PCC encoded data is represented by a single-track declaration. Single-track encapsulation of G-PCC data may utilize a simple ISOBMFF encapsulation by storing the G-PCC data file in a single track without further processing. Each sample in this track contains one or more G-PCC components. For example, each sample comprises one or more TLV encapsulation structures. FIG. 5 depicts an example of a structure for a sample when the G-PCC geometry and attribute data are stored in a single track. The structure includes parameter set TLV field (if present) 502, geometry TLV field 504, and attribute TLV field (if present) 506.

When the coded G-PCC geometry data and the coded G-PCC attribute data are stored in separate tracks, each sample in a track contains at least one TLV encapsulation structure carrying a single G-PCC component data. FIG. 6 shows the structure of a multi-track ISOBMFF G-PCC container as in accordance with a recent draft of the MPEG-I Part 18 (ISO/IEC 23090-18) standard (N19286, "WD of ISO/IEC 23090-18 Carriage of Geometry-based Point Cloud Compression Data", MPEG 130, April 2020). The boxes in FIG. 6 map to corresponding ISOBMFF boxes in ISO/IEC 14496-12.

Based on the structure of FIG. 6, a multi-track G-PCC ISOBMFF container includes the following: (i) a G-PCC track 608 that contains a Geometry parameter set, a Sequence parameter set, and geometry data samples 610 carrying geometry data TLV units, which track also includes track references to other tracks carrying the payloads of G-PCC attribute component(s) 612; and (ii) zero or more G-PCC tracks 614 each containing the respective attribute's Attribute parameter set and attribute data samples 616 carrying attribute data TLV units 618.

When a G-PCC data file is carried in multiple tracks, the track reference tool of ISO/IEC 14496-12 ("Coding of Audio-Visual Objects, Part 12: ISO Base Media File Format," 2015) is used to link between G-PCC component tracks. One TrackReferenceTypeBoxes is added to a TrackReferenceBox within the TrackBox of the G-PCC track. The TrackReferenceTypeBox contains an array of track_IDs designating the tracks that the G-PCC track references. To link the G-PCC geometry track to the G-PCC attribute track, a reference_type of a TrackReferenceTypeBox in the G-PCC geometry track identifies the associated attribute tracks. The 4CCs of these track reference types is 'gpca': the referenced track(s) contain the coded data file of G-PCC attribute data.

When the 3D spatial region information and the associated G-PCC tiles within a 3D spatial region in the G-PCC data file are changing dynamically, a timed metadata track carries the dynamically changing 3D spatial regions information. This 3D spatial region information timed meta data track provides the association between the 3D spatial region information and the corresponding G-PCC tiles for each 3D spatial region over time.

The timed-metadata track may contain a 'cdsc' track reference to the G-PCC base track. The G-PCC base track may advantageously contain a new track reference type identified using the 4CC 'gbsr' to the timed-metadata track.

Non-timed G-PCC data is encapsulated into an ISOBMFF file using G-PCC items. An item is a box carrying the data that does not require timed processing, as opposed to sample data as described in ISO/IEC 14496-12, "Coding of Audio-Visual Objects, Part 12: ISO Base Media File Format," 2015. The carriage of non-timed G-PCC data is supported using either a single item or multiple items with G-PCC tiles. For multiple items with G-PCC tiles, a new item of type 'gpt1' along with a property item and item reference are described in N00075, "Text of ISO/IEC DIS 23090-18 Carriage of Geometry-based Point Cloud Compression Data," MPEG 132, October 2020 to support partial access.

Figure 7:
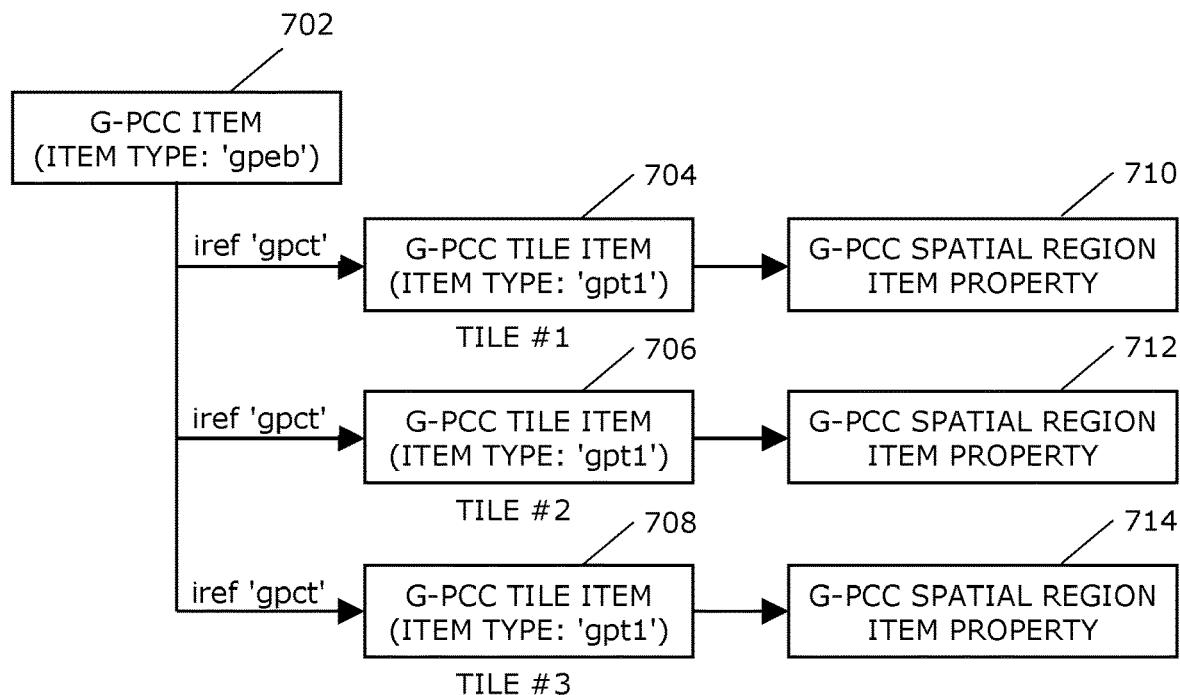
FIG. 7 is a diagram showing an example of carriage of non-timed G-PCC data.

Data for one or more G-PCC tiles may be carried in one GPCC tile item. FIG. 7 shows a working example of carriage of non-timed G-PCC data. As shown in the example of FIG. 7, data for a GPCC item 702 for three G-PCC tiles is carried in three tile items by storing each G-PCC tile in a separate tile item 704, 706, 708. A player identifies a tile item containing a proper G-PCC tile by interpreting the associated spatial region item property 710, 712, 714.

Figure 8:
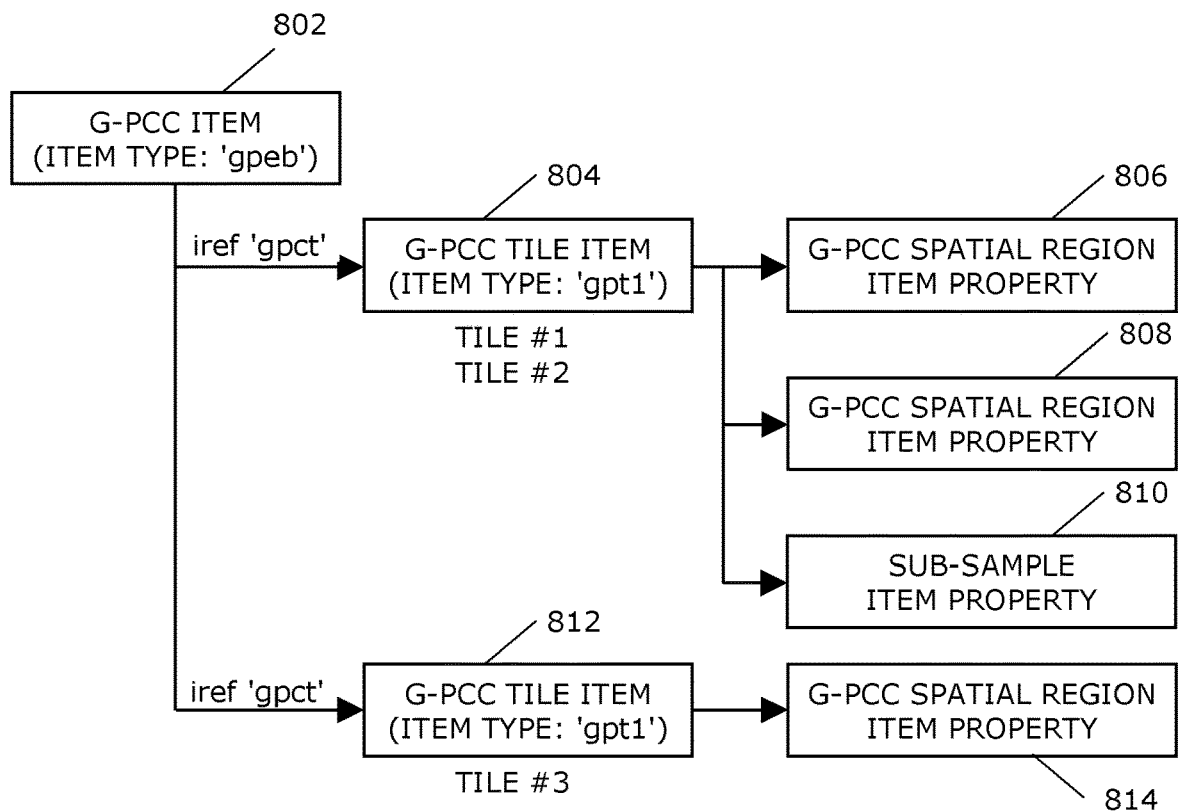
FIG. 8 is a diagram showing a G-PCC tile item containing multiple G-PCC tiles.

As shown in the example of FIG. 8, data for two G-PCC tiles (TILE #1 and TILE #2) is carried in one tile item 804 with associated spatial region item properties 806, 808. For the support of finer-grain indication of G-PCC tiles, sub-sample information 810 may be used even though one G-PCC tile item 804 contains multiple G-PCC tiles as shown in FIG. 8. For instance, the sub-sample information 810 may be suitable to indicate the identifier of tiles that are contained within a G-PCC tile item. Data for another G-PCC tile (TILE #3) is carried in a second tile item 812 with an associated spatial region item property 814.

When the geometry stream of the G-PCC data file contains multiple tiles, each tile, or a group of tiles, is encapsulated in a separate track, called a geometry tile track. The geometry tile track carries TLV units of one or more geometry tiles, therefore enabling direct access to these tiles. Similarly, the attribute stream(s) of the G-PCC data file containing multiple tiles may also be carried in multiple attribute tile tracks. Thus, the G-PCC tile tracks for a tile include a geometry tile track that contains the geometry information for the tile carried in the track and, optionally, one or more attribute tile tracks that contain the attribute information (such as TLV units) for the tile carried in the track.

G-PCC tile data is carried in separate geometry and attribute tile tracks in the container. For example, each tile may be carried in a geometry tile track dedicated to that tile and one or more attribute tile tracks dedicated to that tile. To support partial access in ISOBMFF containers for G-PCC coded streams, tiles corresponding to a spatial region within the point cloud scene are signaled in the samples of a timed-metadata track, such as a track with a Dynamic3DSpatialRegionSampleEntry, as described in ISO/IEC 23090-18 or in the GPCCSpatialRegionInfoBox box described in ISO/IEC 23090-18. The timed metadata track is a separate track present in the container. The timed metadata track contains information identifying the spatial regions present in the G-PCC scene. The timed metadata track also contains tile identifiers (IDs) associated with tiles present in each spatial region. When a user wants to stream the content related to a particular or selected spatial region, the player application parses the tile IDs present in the selected spatial region and downloads and/or extracts the tile data present in the respective G-PCC tile tracks related to those tile ID(s). The tile track Sample entry contains a list of tile(s) present in that tile track. Players and streaming clients are thus enabled to retrieve only the set of tile tracks carrying the information needed to render certain spatial regions or tiles within a point cloud scene.

Figure 9:
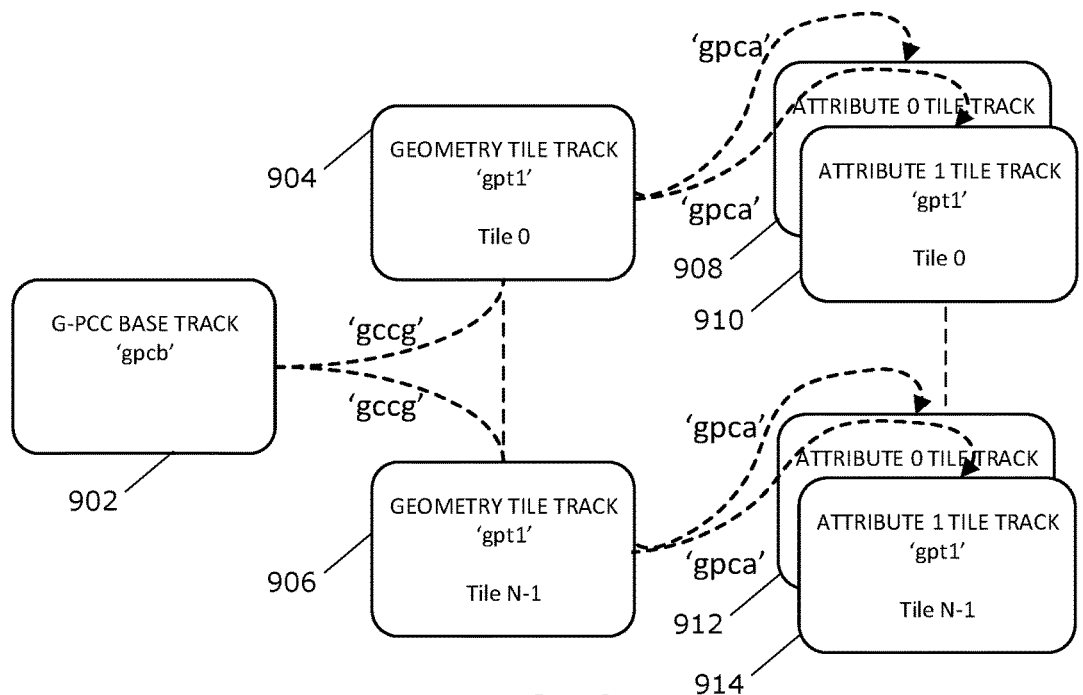
FIG. 9 is a diagram showing encapsulation of a G-PCC data file in multiple tile tracks according to an embodiment.

The architecture of an example of a formatted container including a G-PCC base track 902, G-PCC geometry tile tracks 904, 906, and G-PCC attribute tile tracks 908, 910, 912, 914 is shown in FIG. 9. A G-PCC base track 902 carries the TLV encapsulation structures containing, for example, only SPS, GPS, APS, and tile inventory information as described in ISO/IEC 23090-9. The base track 902 carries initialization information that facilitates decoding to begin for each tile. To link the G-PCC base track 902 to the geometry tile tracks 904, 906, a track reference with a new track reference type is identified using the four-character code (4CC) 'gpbt'. Track references of the new track reference type 'gpbt' are used to link or associate the G-PCC base track 'gpcb' 902 with each of the geometry tile tracks 904, 906, such as the G-PCC geometry tile tracks 904, 906 'gpt1' for tiles 0 through N−1 as shown in FIG. 9.

Each geometry tile track 904, 906 is linked with the G-PCC attribute tile tracks 908, 910, 912, 914 carrying attribute information of the respective tile or tile group, for example, using the track reference tool of ISO/IEC 14496-12. The 4CCs of these track reference types may be called 'gpca' as described in ISO/IEC 23090-18. As shown in FIG. 9, each geometry tile track 'gpt1' 904, 906 for tile 0 through tile N−1 is linked or associated through the 'gpca' track reference type with one or more attribute G-PCC tile tracks 908, 910, 912, 914 corresponding to tile 0 through tile N−1, respectively, and carrying attribute information of the respective tile or tile group.

In another embodiment, when the G-PCC data file contains multiple tiles and the tile data is carried in geometry tile tracks and attribute tile tracks, the G-PCC base track may use a GPCCSampleEntry with a sample entry type of 'gpcb'.

A G-PCC base track sample entry, for example, contains a GPCCConfigurationBox such as described in ISO/IEC 23090-18. Under the 'gpcb' sample entry, all parameter sets such as described in ISO/IEC 23090-9 may be present in the setupUnit array or in the data file. Under the 'gpcb' sample entry, GPCCComponentTypeBox is not present.

In another embodiment, when the parameter set data and tile inventory information are changed frequently, the parameter set data and tile inventory information may be carried in the base track as part of G-PCC sample such as described in ISO/IEC 23090-18. The GPCC sample in the base track may carry only the SPS, GPS, APS and Tile Inventory information TLV_encapsulation units and may advantageously not contain any geometry or attribute data TLV encapsulation units.

The G-PCC base track sample (carrying parameter set and tile inventory data) that decodes the G-PCC tile track sample is identified using the presentation time of the sample. The corresponding base track sample's presentation time is, for example, either equal to or less than the tile track sample presentation time. When the presentation time of the base track and tile track samples do not match exactly, the base track sample with presentation time closer to the presentation time of the tile track sample is used for decoding such a tile track sample or identifying the sample's tile inventory information. The presentation time of the G-PCC sample (base track or tile track) may be derived by parsing the 'ctts' table in the CompositionOffsetBox and 'stts' table in the TimeToSampleBox, such as described in ISO/IEC 14496-12, in the respective tracks.

In another embodiment, when the tile inventory information is available in the G-PCC data file and the information is not changing over time, tile inventory information described in ISO/IEC 23090-9 may be present in the setupUnit array of the tile base track sample entry or in the samples.

A G-PCC tile track is identified by a GPCCTileSampleEntry sample description. The sample entry type for a G-PCC geometry or attribute tile track is 'gpt1'. A GPCCTileSampleEntry may be described as follows:

Sample Entry Type: 'gpt1'
Container: Sample Description Box ('stsd')
Mandatory: No
Quantity: Zero or more sample entries may be present

```
aligned(8) class GPCCTileConfigurationRecord {
  unsigned int(8) configurationVersion = 1;
}
aligned(8) class GPCCTileConfigurationBox extends Box('vptC') {
  GPCCTileConfigurationRecord( ) gpccTileConfig;
}
aligned(8) class GPCCTileSampleEntry
  extends VolumetricVisualSampleEntry ('gpt1') {
  unsigned int(16) num_tiles_in_track;
  unsigned int(1) dynamic_tile_id_flag;
  bit(7) reserved = 0;
  for(i=0; i < num_tiles_in_track; i++){
    unsigned int(16) tile_id;
  }
  GPCCComponentTypeBox type; // optional
  GPCCTileConfigurationBox config; // optional
}
```

The above sample entry describes media samples of a G-PCC component tile track.

Examples of the Semantics of the Fields in GPCCTileSampleEntry are:

compressorname in the base class VolumetricVisualSampleEntry indicates the name of the compressor used with the value "\013GPCC Coding" being recommended; the first byte is a count of the remaining bytes, here represented by \013, which (being octal 13) is 11 (decimal), the number of bytes in the rest of the string;

config is a G-PCC Tile group configuration record information;

type is an instance of the GPCCComponentTypeBox, which indicates the type of the G-PCC component carried in the respective track; when all the components' data is carried together this box is not present;

num_tiles_in_track indicates the number of tiles carried in a respective track;

dynamic_tile_id_flag indicates whether the tile_id is changed in the data file; Value 0 indicates the tile_id value does not change throughout the data file; Value 1 indicates the tile_id value is changed in the data file; when this flag is set to 1, tile index is used instead of tile id to represent that particular tile; default value of this flag is 0;

tile_id indicates a unique identifier for a particular tile in the tile inventory; when dynamic_tile_id_flag is set to value 0, tile_id represents one of the tile id values present in the tile inventory; when dynamic_tile_id_flag is set to value 1, tile_id represents a tile index in the tile inventory.

In another embodiment, a G-PCC tile track advantageously indicates all the tile identifiers present in the samples of a respective tile track. The tile identifiers present in a tile track are signaled in GPCCTileSampleEntry. The tile identifiers present in a tile track samples shall not overlap with the tile identifiers present in other tile track(s) samples. A description of GPCCTileSampleEntry is as follows:

Sample Entry Type: 'gpt1'
Container: Sample Description Box ('stsd')
Mandatory: No
Quantity: Zero or more sample entries may be present

```
aligned(8) class GPCCTileSampleEntry
    extends VolumetricVisualSampleEntry ('gpt1') {
    unsigned int(1) dynamic_tile_id_flag;
    bit(7) reserved = 0;
    unsigned int(16) max_num_tile_ids_in_track;
    for(i=0; i < max_num_tile_ids_in_track; i++){
        unsigned int(16) tile_id;
    }
    GPCCComponentTypeBox type; // optional
    GPCCTileConfigurationBox config; // optional
}
```

The above sample entry describes media samples of a G-PCC component tile track.

Examples of the semantics of the fields in GPCCTileSampleEntry are:

compressorname in the base class VolumetricVisualSampleEntry indicates the name of the compressor used with the value "\013GPCC Coding" being recommended; the first byte is a count of the remaining bytes, here represented by \013, which (being octal 13) is 11 (decimal), the number of bytes in the rest of the string.

config is a G-PCC Tile group configuration record information.

type is an instance of the GPCCComponentTypeBox, which indicates the type of the G-PCC component carried in the respective track. When all the components' data is carried together, this box is not present.

dynamic_tile_id_flag indicates whether the number of tiles or the tile identifiers present in a tile track sample are changing dynamically in the stream. Value 0 indicates all the samples in a tile track contain the same number of tiles and the tile identifiers of those tiles are not changing. Value 1 indicates the number of tiles present in the tile track samples is changing or the tile identifiers in the tile track samples are changing in the stream.

max_num_tile_ids_in_track indicates the maximum number of unique G-PCC tile identifiers present in the samples of the respective track. When dynamic_num_tiles_flag is 0, each sample in a tile track shall contain max_num_tile_ids_in_track number of tiles and the tile identifiers of those tiles are not changing in the stream. When dynamic_num_tiles_flag is 1, each sample in the tile track contains at most max_num_tile_ids_in_track number of tiles and the tile identifiers of those tiles may change between samples.

tile_id indicates an identifier for a particular G-PCC tile corresponding to samples in the respective track.

Samples in the geometry and attribute tile tracks may have the same sample format described in ISO/IEC WD 23090-18. The flags value in a codec_specific_parameters field of the SubsampleInformationBox is advantageously set to 1. Each G-PCC sample in the tile track that corresponds to a single point cloud frame contains one or more TLV encapsulation structures that belong to the same presentation time. All the TLV encapsulation structures present in a sample advantageously have the same presentation time. Each TLV encapsulation structure contains a single type of G-PCC payload, e.g., a geometry data unit or an attribute data unit. In an embodiment, when the parameter set information and the tile inventory information is carried in the G-PCC base track, the parameter set information and the tile inventory information are not carried in the G-PCC tile track samples.

The G-PCC base track is linked to the geometry tile tracks using a track reference. A new track reference type is described using the four-character code (4CC) 'gpbt' to link the G-PCC base track and the geometry tile tracks.

Each geometry tile track is linked with the other G-PCC tile tracks carrying attribute information for the tiles in the geometry tile track using the 'gpca' track reference type as described in ISO/IEC WD 23090-18.

When all the G-PCC components of a tile or a group of tiles are carried in a single tile track, the G-PCC sample includes multiple sub-samples.

In another embodiment, when all the G-PCC components of a tile or a group of tiles is carried in a single tile track, a sample entry type of 'gptm' is used to indicate that G-PCC samples contain a representation of two or more temporally interleaved GPCC component data.

A 'gptm' sample entry may be described as follows:
Sample Entry Type: 'gpt1'
Container: SampleDescriptionBox
Mandatory: No
Quantity: Zero or one sample entries may be present.

Presence of the 'gptm' sample entry type indicates that a temporal interleaving component packing arrangement is used. The composition time for component_count_minus1+1 consecutive samples is equal to the value of first sample in the group of samples in the interleaved component packing arrangement. The syntax may be as follows:

```
aligned(8) class GPCCMultiComponentSampleEntry
    extends VolumetricVisualSampleEntry ( ) {
    unsigned int(4) reserved = 0;
    unsigned int(4) component_count_minus1;
    GPCCConfigurationBox config; // optional
}
```

In the semantics, component_count_minus1 plus 1 indicates the number of G-PCC component samples present in the track as consecutive samples.

In another embodiment, the number and layout of the tiles in the G-PCC frames is fixed for the entire duration of the coded point cloud sequence to avoid an explosion in the number of tracks in the container file.

Alternative tracks and their groupings are visualized as shown in FIG. 10. Track alternatives may be indicated by the alternate tracks mechanism described in ISO/IEC 14496-12, for example, the alternate_group field of the TrackHeaderBox. Geometry and attributes are G-PCC components. G-PCC component tile tracks include geometry tile tracks and attribute tile tracks. G-PCC component tile tracks 1004, 1006, 1010, 1012, 1014, 1016, 1018, 1020, 1022, 1024 that have the same alternate_group value are different encoded versions of the same G-PCC component. A G-PCC scene may be coded in alternatives. When G-PCC scenes are coded in alternatives, G-PCC component tile tracks that are alternatives of each other have the same alternate_group value in their TrackHeaderBox.

G-PCC component tile tracks 1004, 1006, 1010, 1012, 1014, 1016, 1018, 1020, 1022, 1024 may have alternatives. In such a case, all the G-PCC component tile tracks 1004, 1006, 1010, 1012, 1014, 1016, 1018, 1020, 1022, 1024 that belong to an alternative group are referenced by the G-PCC base track 1002 or the respective G-PCC geometry tile track 1004, 1006. G-PCC component tile tracks 1004, 1006, 1010, 1012, 1014, 1016, 1018, 1020, 1022, 1024 that are alternatives of each other use an alternate grouping mechanism, such as described in ISO/IEC 14496-12.

Figure 11:
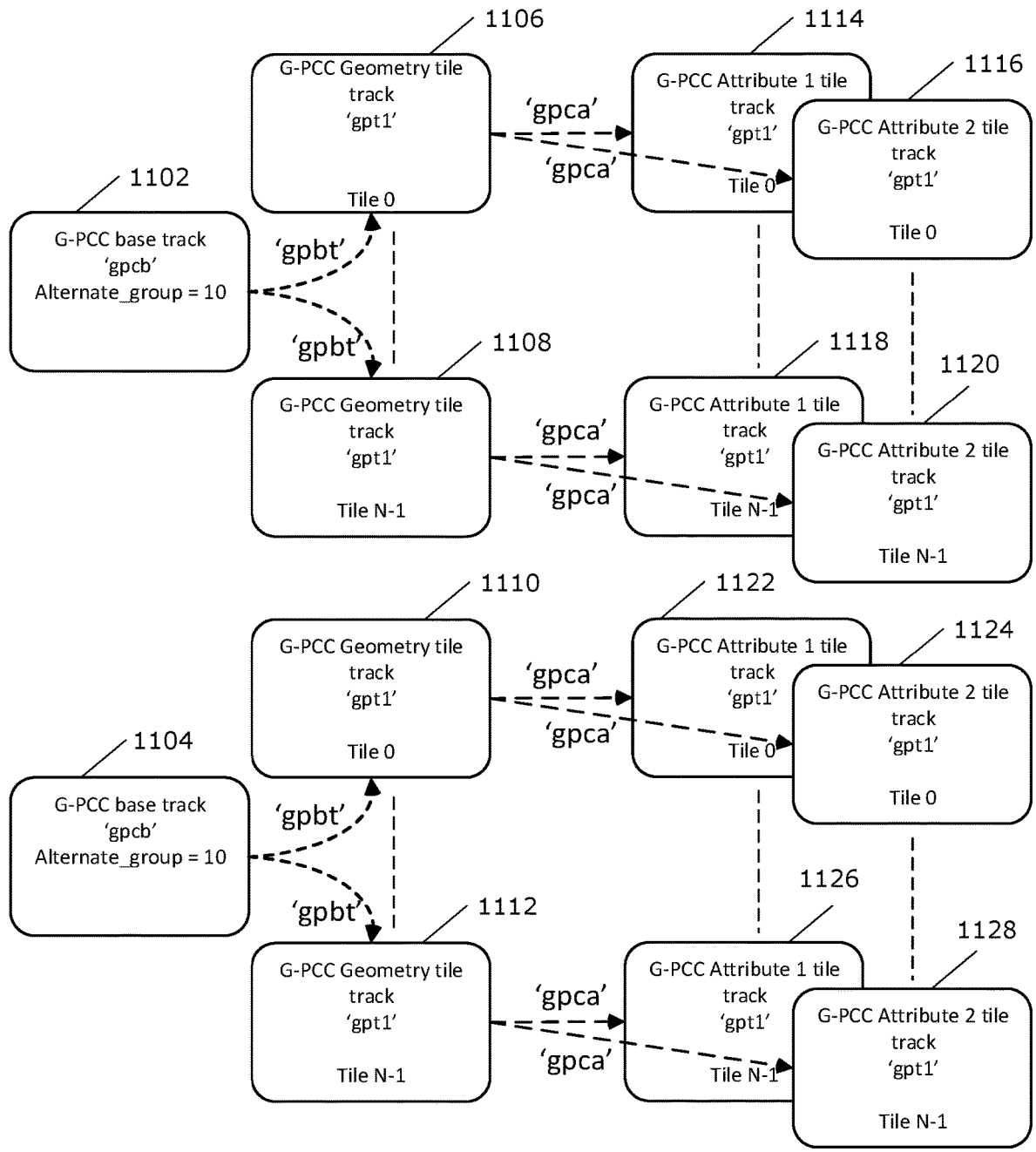
FIG. 11 is a diagram showing G-PCC tile base track alternatives and grouping of corresponding geometry tile tracks and attribute tile tracks.

Alternative tile base tracks 1102, 1104 and grouping of corresponding geometry tile tracks 1106, 1108, 1110, 1112 and attribute tile tracks 1114, 1116, 1118, 1120, 1122, 1124, 1126, 1128 are shown in FIG. 11. A volumetric visual scene may be coded in alternatives. In another embodiment, when different encoded versions of the same G-PCC geometry component are available, and each version of the geometry component is signalled in one tile base track and one or more G-PCC tile tracks, the corresponding G-PCC tile base tracks advantageously have the same alternate_group value. In such a case, all G-PCC tile base tracks that are alternatives of each other advantageously have the same alternate_group value in their TrackHeaderBox.

Figure 12:
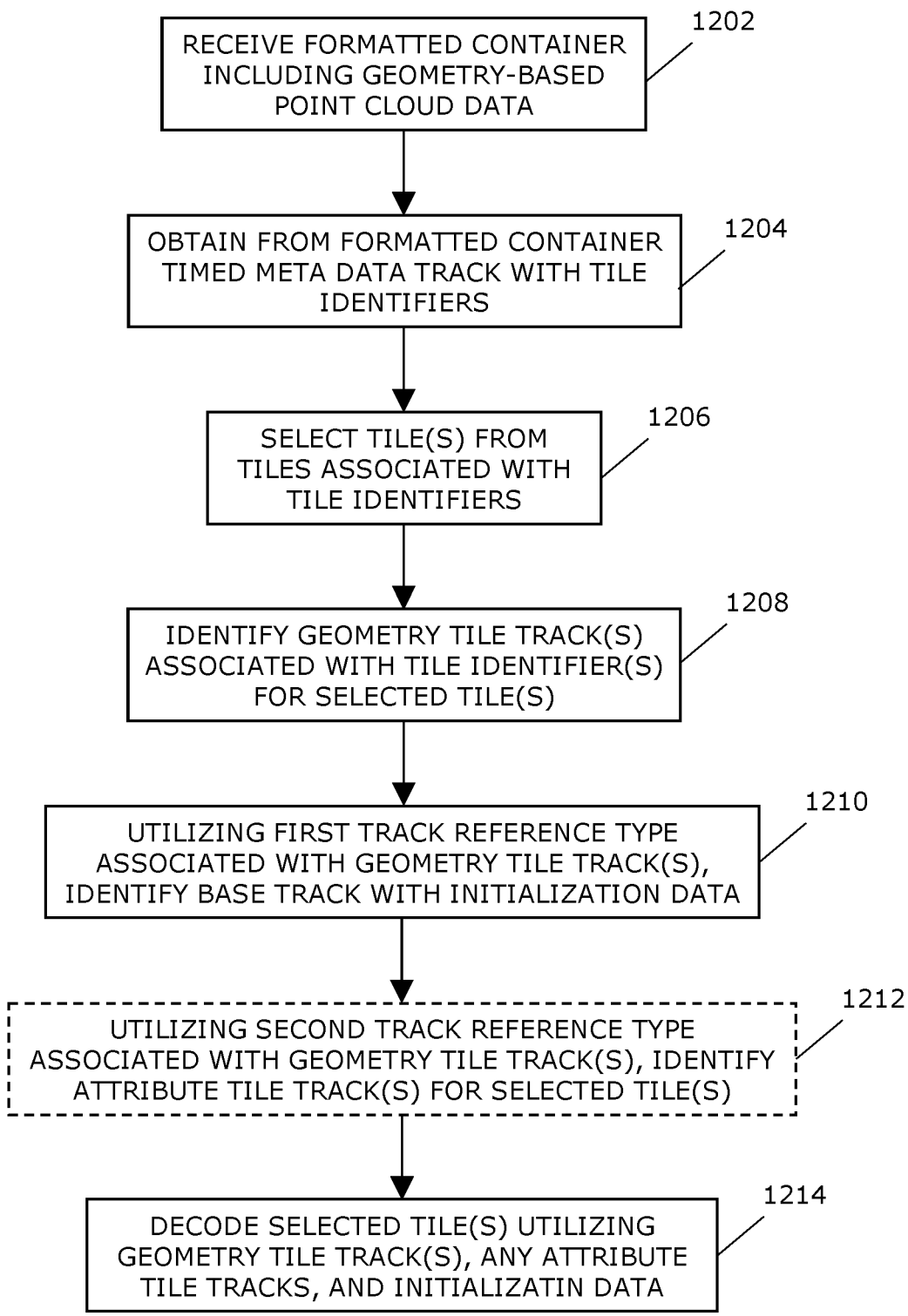
FIG. 12 is a flowchart illustrating a method of decoding a tile of geometry-based point cloud data according to an embodiment.

A flowchart illustrating a method of decoding a tile of geometry-based point cloud data is shown in FIG. 12. The method includes receiving 1202 a formatted container including geometry-based point cloud data comprising a plurality of tiles. A timed meta data track is obtained 1204 from the formatted container. The timed meta data track comprises a plurality of tile identifiers. Each tile identifier corresponds to a respective tile 304 of the plurality of tiles. At least one selected tile is selected 1206 from the plurality of tiles. The at least one selected tile corresponds to at least one tile identifier. At least one geometry tile track associated with the at least one tile identifier is identified 1208 from the formatted container. Utilizing a first track reference type associated with the at least one geometry tile track, a base track including initialization data for the at least one selected tile is identified 1210 from the formatted container. Utilizing a second track reference type associated with the at least one geometry tile track, at least one attribute tile track associated with the at least one selected tile, if present, is identified 1212 from the formatted container. The at least one selected tile is decoded 1214 utilizing the at least one geometry tile track, the at least one attribute tile track, if present, and the initialization data into the at least one decoded tile. The decoding is advantageously performed without decoding all of the geometry-based point cloud data.

The method of FIG. 12 may be applied, for example, to a device having a display, such as a head mounted display, smartphone, or other WTRU. The device identifies a region 304 from a scene of the point cloud 302 or a region 308 of an object 306 of the point cloud to be displayed. Each of the regions 302, 308 may include one or more tiles. The decoded selected tile(s) are rendered on the display. Alternatively, the decoded selected tile(s) may be streamed or utilized in other ways, such as dynamic video streaming applications capable of decoding geometry based point cloud content. The tiles may be streamed from a server and decoded on a receiving client/UE/device (hereinafter referred to as "client"). Streaming may be performed using any streaming or transport protocol, for example, dynamic adaptive streaming over HTTP (DASH).

Figure 13:
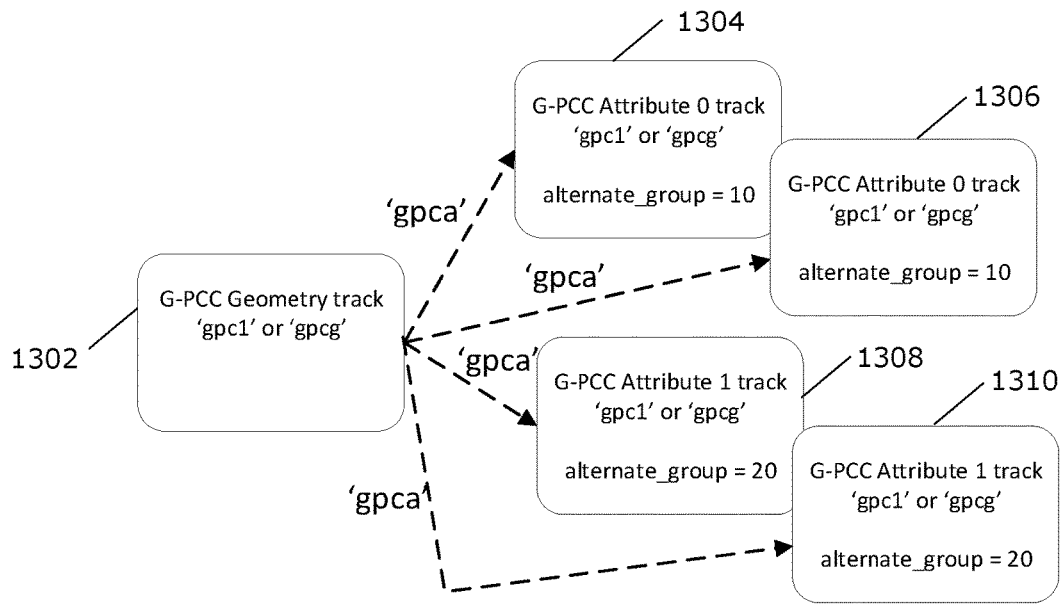
FIG. 13 is a diagram illustrating a grouping of alternative attribute tracks and corresponding geometry track for multiple tracks according to an embodiment.

A volumetric visual scene may be coded in alternatives. In another embodiment, when different encoded versions of the same G-PCC attribute component are available and each version of the attribute component is signalled in a single track or one or more G-PCC tile tracks, the corresponding G-PCC attribute tracks may have the same alternate_group value. G-PCC attribute tracks that are alternatives of each other advantageously may have the same alternate_group value in their TrackHeaderBox. The G-PCC attribute tile tracks that are alternatives of each other advantageously have the same alternate_group value in their TrackHeaderBox. A diagram illustrating a grouping of alternative attribute tracks and a corresponding geometry track for multiple tracks is shown in FIG. 13. G-PCC attribute tracks 1304, 1308 may have alternatives such as G-PCC attribute tracks 1306, 1310, respectively. All the G-PCC attribute tracks 1304, 1306, 1308, 1310 that belong to an alternative group are advantageously referenced by the respective G-PCC geometry track 1302. G-PCC attribute tracks 1304, 1306 that are alternatives of each other may use an alternate grouping mechanism, such as described in ISO/IEC 14496-12.

Figure 14:
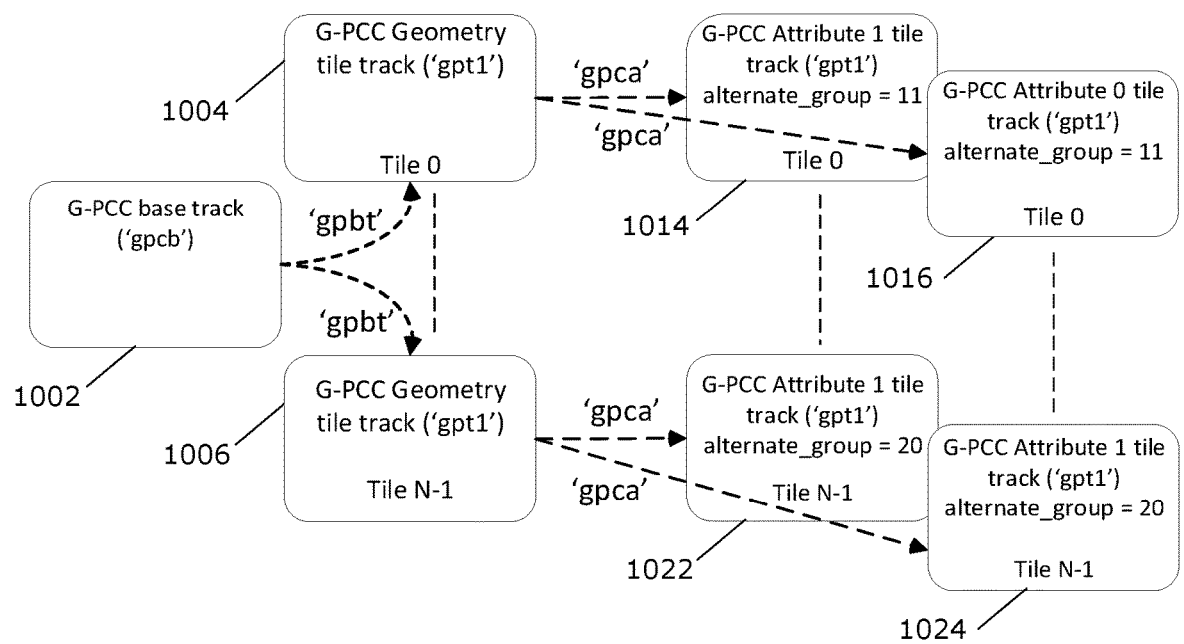
FIG. 14 is a diagram illustrating a grouping of alternative attribute tile tracks and corresponding geometry tile tracks according to an embodiment.

A diagram illustrating a grouping of alternative attribute tile tracks and corresponding geometry tile tracks is shown in FIG. 14. A grouping of a geometry tile track and corresponding alternative attribute tile tracks for each of N Tiles labelled 0 through N−1 are shown for a G-PCC base track. G-PCC attribute tile tracks 1014, 1022 may have alternatives such as G-PCC attribute tile tracks 1016, 1024, respectively. All the G-PCC attribute tile tracks 1014, 1016, 1022, 1024 that belong to an alternative group are advantageously referenced by the G-PCC base track 1002 or the respective G-PCC geometry tile tracks 1004 and 1006. G-PCC attribute tile tracks 1014, 1016, 1022, 1024 that are alternatives of each other may use an alternate grouping mechanism, such as described in ISO/IEC 14496-12.

In another embodiment, to link static 3D spatial region information to the G-PCC base track, a GPCCSpatialRegionInfoBox box may be added to the base track. The base track carries parameter set data such as SPS, GPS, APS, Tile Inventory information TLV units along with the GPCCSpatialRegionInfoBox box.

In another embodiment, when 3D spatial region information changes dynamically, G-PCC base track is linked to the timed meta-data track 1502 carrying the dynamically changing 3D spatial region information using the track reference tool of ISO/IEC 14496-12. The timed meta-data track 1502 may advantageously contain a 'cdsc' track reference to the G-PCC base track. The G-PCC base track may advantageously contain a new track reference type described using the 4CC 'gb3d' to the timed-metadata track.

Figure 15:
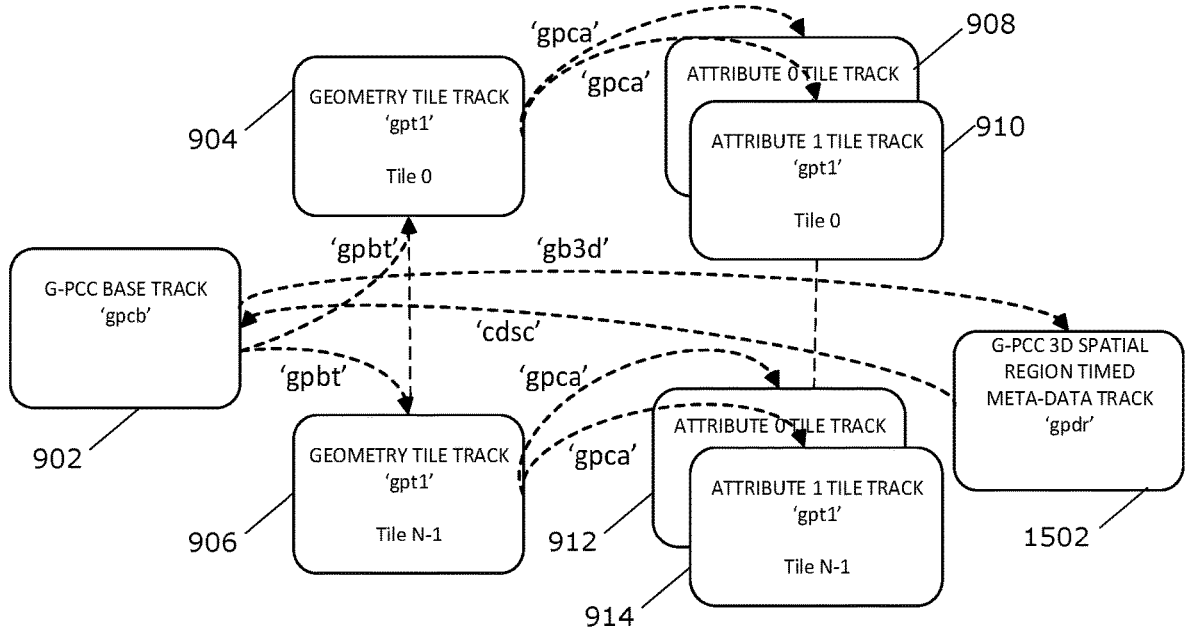
FIG. 15 is a diagram showing encapsulation of a G-PCC data file with track referencing between base track, multiple tile tracks, and a 3D spatial region timed meta-data track according to an embodiment.

The overall architecture of the G-PCC base track, G-PCC tile tracks, 3D spatial region timed meta-data track 1502, and the track referencing between base track 902 and 3D spatial region timed meta-data track 1502 is shown in FIG. 15.

GPCCComponentTypeBox described in ISO/IEC 23090-18 represents the type of the G-PCC component, e.g., geometry or attribute. In another embodiment, to represent the type of the attribute component present in the data file and to distinguish various attribute components present in the G-PCC data file, GPCCComponentInfoBox is described as replacing GPCCComponentTypeBox as described in ISO/IEC 23090-18.

GPCCComponentInfoBox box signals information for the G-PCC components. When this box is present in sample entries of tracks carrying G-PCC component data, this box indicates the type of the G-PCC component carried by the respective track. This box also provides the attribute type and index when the respective track carries a G-PCC attribute component. The attr_index variable in GPCCComponentInfoBox distinguishes the various attribute components with the same attr_type value as specified in Table 8 of ISO/IEC 23090-9. When the G-PCC data file is stored in a single track, this box is advantageously not be present in the sample entry.
Example Syntax May be as Follows:

```
aligned(8) class GPCCComponentInfoBox
    extends FullBox('gtyp', version = 0, 0) {
  unsigned int(8) gpcc_type;
  if(gpcc_type == 4) {
    unsigned int(8) attr_type;
    unsigned int(8) attr_index;
  }
}
```

The semantics may be as follows: attr_type identifies the type of attribute component as specified in Table 8 of ISO/IEC 23090-9, and attr_index identifies the order of the attribute in the SPS.

In another embodiment, the GPCCComponentInfoBox box also provides the attribute name, index, and an optional attribute type or attribute object identifier when the respective track carries a G-PCC attribute component.

An example of the syntax of GPCCComponentInfoBox box is as follows.

```
aligned(8) class GPCCComponentInfoBox
    extends FullBox('gtyp', version = 0, 0) {
  unsigned int(8) gpcc_type;
  if(gpcc_type == 4) {
    unsigned int(8)    attr_index;
    unsigned int(1)    attr_type_present;
    unsigned int(1)    known_attribute_label_flag;
    bit(3)             reserved = 0;
    if (attr_type_present) {
      if(known_attribute_label_flag)
        unsigned int(3) attr_type;
      else {
        bit(3)   reserved = 0;
        oid      attribute_label_oid ( );
      }
    } else {
      bit(3)    reserved = 0;
    }
    utf8string    attr_name;
  }
}
```

The semantics of GPCCComponentInfoBox box may be as follows.
attr_index identifies the order of the attribute in the SPS.
attr_type_present indicates the presence of attribute type information in the GPCCComponentInfoBox. Value 1 indicates the attribute type information is signalled in this box. Value 0 indicates the attribute type information is not signalled.
known_attribute_label_flag indicates whether the attribute is identified by the value of attr_type or by the international object identifier attribute_label_oid.
attr_type identifies the type of attribute component as specified in Table 8 of ISO/IEC 23090-9.
attribute_label_oid identifies the international object identifier as specified in Recommendation ITU-T X.660 |ISO/IEC 9834-1. The syntax of object identifier is described in sub-clause 9.6.5.1 of ISO/IEC 23090-9.
attr_name specifies a human-readable name for the type of G-PCC attribute components.

In another embodiment, when the G-PCC data file contains 3D objects, a 3DObjectInfoStruct provides the bounding box information of a 3D object.

3DObjectInfoStruct provides the bounding box information for a 3D object including the X, Y, Z coordinate values of the anchor point and the size of the bounding box along the X, Y, Z axes relative to the anchor point.
Example Syntax May be as Follows:

```
aligned(8) class 3DObjectInfoStruct(anchor_included,
                                    dimension_included) {
  unsigned int(16) 3d_object_id;
  if(anchor_included)
  {
    unsinged int(16)        anchor_x;
    unsinged int(16)        anchor_y;
    unsinged int(16)        anchor_z;
  }
  if (dimension_included)
  {
    unsinged int(16)        object_dx;
    unsinged int(16)        object_dy;
    unsinged int(16)        object_dz;
  }
}
```

The Semantics May be as Follows:
anchor_included indicates whether the X, Y, Z coordinate values of the origin position of the 3D object is included in the structure;
dimension_included equal to 1 indicates the dimensions of the 3D object are signalled in the structure.
dimension_included equal to 0 indicates the dimensions of the 3D object are not signalled in the structure;
3d_object_id indicate the 3D object identifier;
anchor_x, anchor_y, and anchor_z indicates the x, y and z offsets of the anchor point of the 3D object, respectively, in cartesian coordinates. When absent in the structure, the anchor point may be inferred to be equal to (0, 0, 0);
object_dx, object_dy, and object_dz indicate the size of the 3D object in the Cartesian coordinates along the x, y, and z axes, respectively, relative to the anchor point and indicates the width, height, and depth of the 3D object in the Cartesian coordinates.

In another embodiment, when the 3D objects present in the G-PCC data are static, the GPCC3DObjectsInfoBox present the in the G-PCC base track provides the 3D objects bounding box information and the associated G-PCC tiles for each 3D object.

GPCC3DObjectsInfoBox provides information on 3D objects present in the G-PCC data file including bounding box information such as the X, Y, Z coordinate values of the anchor point and the size of the 3D object's bounding box along the X, Y, Z axes relative to the anchor point. This box also provides a mapping to a set of tiles for each object and the object is enabled or disabled.

GPCC3DObjectsInfoBox box may optionally be present in the sample entry of G-PCC base track. When a GPCC3DObjectsInfoBox box is present in the sample entry of G-PCC base track, GPCC3DObjectsInfoBox indicates the information of static 3D objects present in the G-PCC data. Example Syntax May be as Follows:

```
aligned(8) class GPCC3DObjectsInfoBox extends FullBox('gpso',0,0){
    unsigned int(15) num_objects;
    for (int i=0; i < num_objects; i++) {
        3DObjectInfoStruct(1,1);
        unsigned int(7) num_tiles[i];
        unsigned int(1) object_enabled;
        for(int j=0; j < num_tiles; j++)
            unsigned int(16) tile_id[j];
    }
}
```

The Semantics May be as Follows:
num_objects indicate the number of 3D objects present in the point cloud;
3DObjectInfoStruct provides the 3D object spatial information indicated by the anchor point and the size of the 3D object along the X, Y, Z axes relative to the anchor point;
num_tiles[i] indicates the number of G-PCC tiles associated with the i-th 3D object;
object_enabled equal to 1 indicates the 3D object is active in the scene. object_enabled equal to 0 indicates the 3D object is not present in the first frame of the G-PCC data file;
tile_id[j] identifies the j-th G-PCC tile associated with the i-th 3D object.

In another embodiment, when the 3D objects bounding box information and the associated G-PCC tiles with a 3D object in the G-PCC data file are changing dynamically, a timed metadata track carries the dynamically changing 3D objects information. This 3D objects information timed meta data track provides an association between the 3D object information and the corresponding G-PCC tiles for each 3D object over time.

The timed-metadata track 1502 may advantageously contain a 'cdsc' track reference to the G-PCC base track. The G-PCC base track may advantageously contain a new track reference type described using the 4CC 'gb3d' to the timed meta-data track 1502.

Sync samples in the timed meta data track may advantageously carry the dimensions and the associated tile mapping information for all the 3D objects irrespective of whether the 3D object is enabled. For sync samples, the values of dynamic_dimension_flag and dynamic_tile_mapping_flag flags for each 3D object are set to 1. The object_enabled flag is set to 1 when that object is active in that sync sample, otherwise the object_enabled flag is set to 0.

Non sync samples in this timed meta data track may advantageously carry only the updated 3D objects information with reference to the 3D objects information available in the nearest preceding sync sample.

If a base track has an associated timed-metadata track with a sample entry type 'gpdo', the associated 3D object's position in the point cloud data is considered as dynamic.

Sample Entry

```
aligned(8) class Dynamic3DObjectsInfoSampleEntry
    extends MetaDataSampleEntry('gpdo')
{
    bit(6) reserved=0;
    unsigned int(1) dynamic_dimension_flag;
    unsigned int(1) dynamic_tile_id_mapping_flag;
    GPCC3DObjectsInfoBox( );
}
```

GPCC3DObjectsInfoBox indicates the initial position information of the 3D objects;
num_objects indicates the number of 3D objects signalled in the sample entry; 3DObjectInfoStruct provides the initial information of the i-th 3D object including the anchor point and the size along the X, Y, Z axes relative to the anchor point in Cartesian coordinate in the sample entry;
num_tiles[i] indicates the number of G-PCC tiles associated with the i-th 3D object in the sample entry;
object_enabled equal to 1 indicates the 3D object is active; object_enabled equal to 0 indicates the 3D object is not active;
tile_id [j] identifies the j-th G-PCC tile associated with the i-th 3D object in the sample entry;
dynamic_dimension_flag equal to 0 specifies that the dimension of the 3D objects remains unchanged in all samples referring to this sample entry; dynamic_dimension_flag equal to 1 specifies that the dimension of the 3D object is indicated in each sample;
dynamic_tile_mapping_flag equal to 0 specifies that identifier of tiles associated with the 3D object remains unchanged in all samples referring to this sample entry; dynamic_tile_mapping_flag equal to 1 specifies that identifier of tiles associated with the 3D object present in each sample.

The Sample Syntax of this Sample Entry Type 'Gpdo' May be as Follows:

```
aligned(8) Dynamic3DObjectsInfoSample( ) {
    unsigned int(16) num_objects;
    for (int i=0; i < num_objects; i++) {
        unsigned int(13) 3d_object_id;
        unsigned int(1) object_enabled;
        unsigned int(1) dynamic_dimension_flag;
        unsigned int(1) dynamic_tile_mapping_flag;
        if(dynamic_dimension_flag){
            3DObjectInfoStruct(1, dynamic_dimension_flag);
        if(dynamic_tile_mapping_flag){
            unsigned int(8) num_tiles[i];
            for(int j=0; j < num_tiles; j++)
                unsigned int(16) tile_id[j];
        }
    }
}
``` num_objects indicate the number of 3D objects updated in the sample with reference to the nearest sync sample;
3d_object_id indicates the updated 3D object identifier;
object_enabled equal to 0 specifies the updated 3D object is not present in the sample; object_enabled equal to 1 specifies the updated 3D object is active in the sample;
dynamic_dimension_flag equal to 0 indicates the updated 3D object dimensions have not changed with reference to the nearest sync sample; dynamic_dimension_flag equal to 1 indicates the updated 3D object dimensions have changed with reference to the nearest sync sample;

dynamic_tile_mapping_flag equal to 0 indicates the updated 3D object associated tiles have not changed with reference to the nearest sync sample; dynamic_tile_mapping_flag equal to 1 indicates the updated 3D object associated tiles have changed with reference to the nearest sync sample;

3DObjectInfoStruct provides the updated 3D object spatial information;

num_tiles[i] indicates the number of G-PCC tiles associated with the i-th 3D object when this sample is applied;

tile_id[j] identifies a G-PCC tile associated with the i-th 3D object when this sample is applied.

In another embodiment, sync samples in the 3D spatial region information timed meta data track advantageously carry the dimensions and the associated tile mapping information for all the 3D spatial regions. For sync samples, the values of dynamic_dimension_flag and dynamic_tile_id_flag flags for each 3D spatial region are set to 1.

In another embodiment, non-sync samples in the timed meta data track advantageously carry only the updated 3D spatial regions information with reference to the 3D spatial regions information available in the nearest preceding sync sample.

In another embodiment, the system advantageously sets a sample in the 3D spatial region information timed metadata track as a sync sample or non-sync sample. One sync sample is advantageously present for a specific number of samples (key frame distance) or for a specific time interval (key frame time). The key frame distance or key frame time is advantageously specified by the system.

In another embodiment, for sync samples, the values of dynamic_dimension_flag flag is set to 1, and dynamic_tile_id_flag flag is set to 1 when the tile inventory information is present in the G-PCC data file, and the cancelled_region_flag is set to 0 for each 3D spatial region.

In another embodiment, non-sync samples may optionally signal only the 3D spatial regions with changes relative to the nearest preceding sync sample, including the dimensions or the associated 3D tiles that are updated as well as any added or cancelled 3D spatial regions. The value of cancelled_region_flag flag is set to 1 when a 3D spatial region is cancelled with reference to the preceding sync sample. The value of dynamic_dimension_flag flag is set to 1 when the dimensions of a 3D spatial region in the current sample are updated with reference to the preceding sync sample. The value of dynamic_tile_id_flag flag is set to 1 when the associated tiles of a 3D spatial region in the current sample are updated with reference to the preceding sync sample. Example Syntax May be as Follows:

```
aligned(8) DynamicGPCC3DSpatialRegionSample( ) {
    unsigned int(16) num_regions;
    for (int i=0; i < num_regions; i++) {
        unsigned int(1) cancelled_region_flag;
        unsigned int(1) dynamic_dimension_flag;
        unsigned int(1) dynamic_tile_id_flag;
        unsigned int(5) reserved;
        if(!cancelled_region_flag)
        {
            3DSpatialRegionStruct(dynamic_dimension_flag);
            if(dynamic_tile_id_flag){
                unsigned int(16) num_tiles;
                for(int j=0; j < num_tiles; j++)
                    unsigned int(16) tile_id;
            }
        }
        else
```

-continued

```
        {
            unsigned int(16) 3d_region_id;
        }
    }
}
```

Examples of the Semantics are:

num_regions indicates the number of updated 3D spatial regions signalled in the sample with reference to the previous sync sample. The 3D spatial regions whose dimensions and/or the associated 3D tiles are updated with reference to the previous sync sample are considered as updated regions. The 3D spatial regions that are cancelled in this sample with reference to the previous sync sample are also considered as updated regions.

cancelled_region_flag indicates whether a 3D region is cancelled or updated in the current sample with reference to the previous sync sample. Value 0 indicates the 3D region dimensions and/or the associated 3D tiles are updated with reference to the previous sync sample. Value 1 indicates 3D regions is cancelled in this sample with reference to the previous sync sample.

dynamic_dimension_flag indicates whether or not the dimensions of this 3D region are updated with reference to the previous sync sample.

dynamic_tile_id_flag indicates whether or not the associated 3D tiles of this 3D region are updated with reference to the previous sync sample.

3DSpatialRegionStruct provides the 3D spatial region information of G-PCC data when this sample is applied num_tiles indicates the number of G-PCC tiles associated with the 3D spatial region when this sample is applied tile_id identifies a particular G-PCC tile associated with the 3D spatial region.

3d_region_id identifies a cancelled 3D spatial region with reference to the previous sync sample.

The GPCCSpatialRegionInfoProperty descriptive item property described in 23090-18, which is associated with one or more G-PCC tile items, is used to describe spatial region information including an identifier, an anchor point, and a size of the 3D tiles in cartesian coordinates along the X, Y, Z axes relative to the anchor point. When a client wants partial access to the non-timed data, the client parsed all the GPCCSpatialRegionInfoProperty item properties and finds the interested G-PCC tile items based on the user viewport and the 3D tile inventory information present in the GPCCSpatialRegionInfoProperty property items. This process is tedious at the client side.

The use of GPCCSpatialRegionsInfoProperty descriptive item property resolves the above issue and provides better partial access support.

In another embodiment, each G-PCC item of type 'gpeb' is advantageously associated with the GPCCSpatialRegionsInfoProperty property item. GPCCSpatialRegionsInfoProperty advantageously indicates the 3D region identifier, an offset, and a size of the bounding box information for each 3D region. In another embodiment, each G-PCC item of type 'gpe1' is advantageously associated with the GPCCSpatialRegionsInfoProperty property item when the 3D tile inventory information is available in the G-PCC data file. When the 3D tile inventory information is not available in the G-PCC data file, GPCCSpatialRegionsInfoProperty property item is not present.

In another embodiment, a G-PCC item of type 'gpci' carrying the G-PCC geometry component is advantageously associated with the GPCCSpatialRegionsInfoProperty property item when the 3D tile inventory information is available in the G-PCC data file and the sub-sample item property is linked with that G-PCC item. When the 3D tile inventory information is not available in the G-PCC data file or the sub-sample item property is not linked with that G-PCC item, GPCCSpatialRegionsInfoProperty property item is not present.

Figure 16:
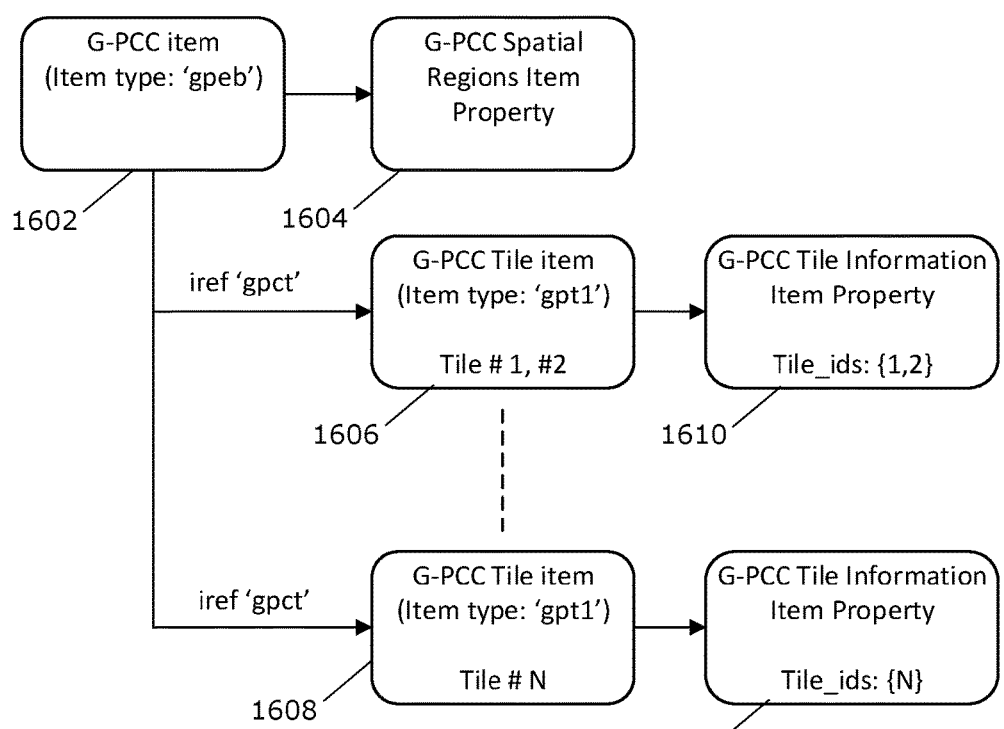
FIG. 16 is a diagram showing partial access of non-timed G-PCC data with N G-PCC tiles.

FIG. 16 is a diagram showing partial access of non-timed G-PCC data item 1602 with N G-PCC tiles, where N is an integer, with a spatial regions item property 1604. FIG. 16 is an example of carriage of non-timed G-PCC data consisting of N G-PCC tiles arranged in multiple G-PCC tile items 1606, 1608 by storing G-PCC tile(s) in separate items with associated tile information item properties 1610, 1612.

Figure 17:
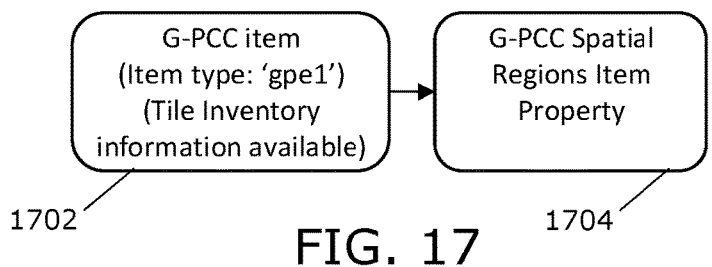
FIG. 17 is a diagram showing partial access of non-timed G-PCC data with a G-PCC item of type 'gpe1'.

FIG. 17 is a diagram showing partial access of non-timed G-PCC data with a G-PCC item 1702 of type 'gpe1'. FIG. 17 is an example of carriage of non-timed G-PCC data with a G-PCC item of type 'gpe1'. When the 3D tile inventory information is available in the G-PCC data file, the G-PCC item is associated with a G-PCC spatial regions item property 1704.

Figure 18:
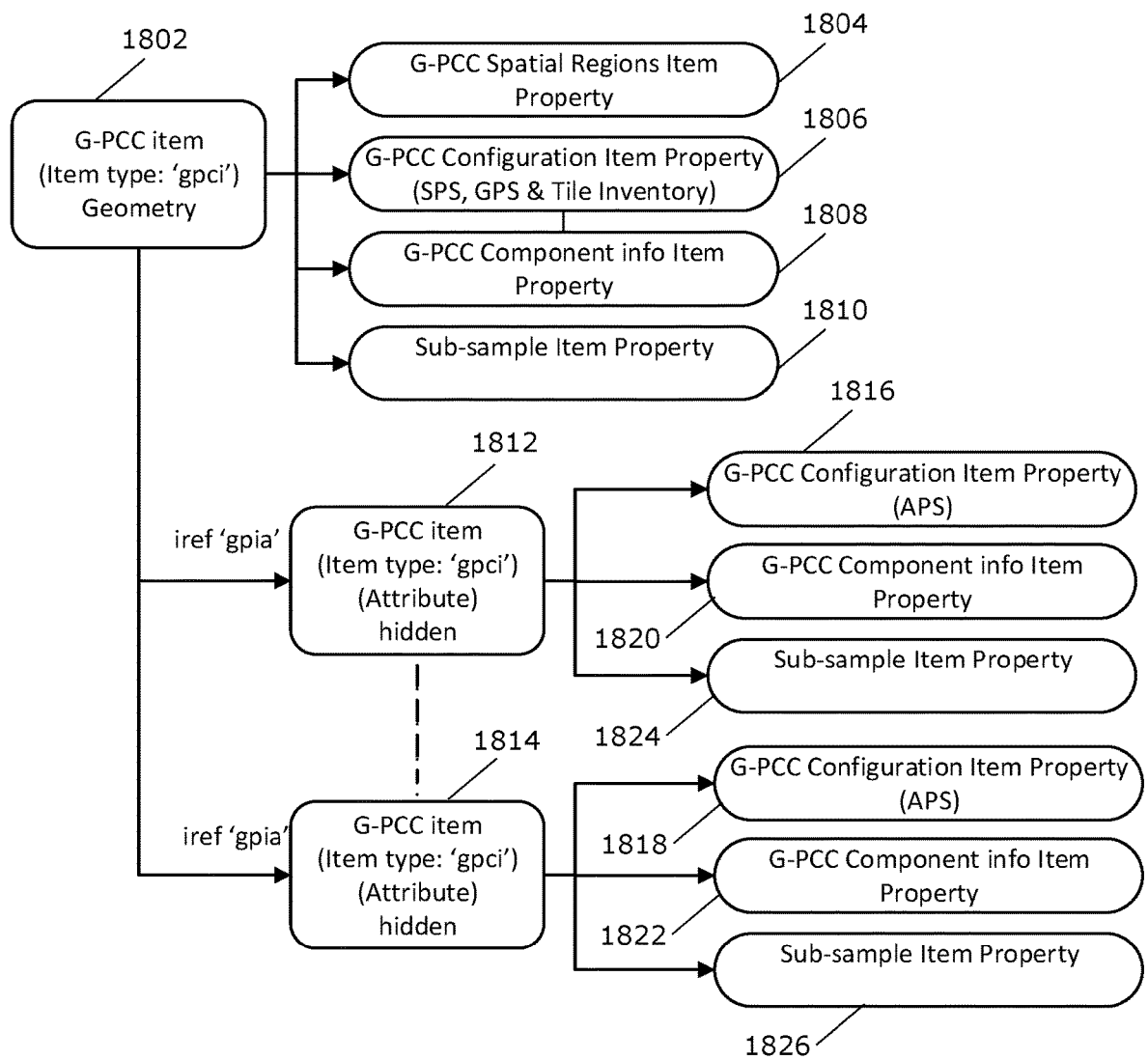
FIG. 18 is a diagram showing partial access of non-timed G-PCC data with a G-PCC item of type 'gpci'.

FIG. 18 is a diagram showing partial access of non-timed G-PCC data with a G-PCC item 1802 of type 'gpci'. FIG. 18 illustrates an example of carriage of non-timed G-PCC data with a G-PCC item 1802 of type 'gpci'. When the 3D tile inventory information 1806 is available in the G-PCC data file and the sub-sample item property 1810 is associated with a G-PCC item of type 'gpci', the G-PCC item 1802 carrying the geometry data is associated with a G-PCC spatial regions item property 1804 and includes an associated component information item property 1808. Each hidden attribute 1812, 1814 is shown with associated configuration item properties 1816, 1818, associated component information item properties 1820, 1822, and sub-sample item properties 1824, 1826.

In another embodiment, a GPCCTileInfoProperty item property describes the tile identifier information of each 3D tile present in a G-PCC tile item. Each G-PCC tile item of type 'gpt1' is advantageously associated with a GPCCTileInfoProperty property item. GPCCTileInfoProperty property item advantageously indicates the 3D tile identifier information of each 3D tile present in the G-PCC tile item of type 'gpt1'. The G-PCC player identifies the required tile identifiers based on the interested viewport region using the G-PCC spatial region item property associated with the G-PCC item. A tile item containing a specific G-PCC tile identifier is interpreted using the associated G-PCC Tile information item property.

GPCCSpatialRegionsInfoProperty and GPCCTileInfoProperty item properties enable the partial access of non-timed G-PCC data.

A G-PCC spatial regions item property may be described as follows.

Box type: 'gpsr'
Property type: Descriptive item property
Container: ItemPropertyContainerBox
Mandatory (per item): Yes, for an item of type 'gpeb' or 'gpe1' when 3D Tile inventory information is available
Quantity (per item): At least one, for an item of type 'gpeb' or 'gpe1' when 3D Tile inventory information is available The GPCCSpatialRegionsInfoProperty descriptive item property is used to describe spatial regions information including the 3D region identifier, anchor point, and size of the 3D spatial region in cartesian coordinates along the X, Y, Z axes relative to the anchor point for each 3D spatial region. The GPCCSpatialRegionsInfoProperty item property also describes the 3D tile(s) identifiers associated with each 3D spatial region.

An Example of Syntax is as Follows:

```
aligned(8) class GPCCSpatialRegionsInfoProperty
extends ItemFullProperty('gpsr', version = 0, flags = 0)
{
   unsigned int(8) num_regions;
   for(int i=0; i< num_regions; i++){
      3DSpatialRegionStruct(1);
      unsigned int(8) num_tiles;
      for(int j=0; j < num_tiles; j++){
         unsigned int(16) tile_id;
      }
   }
}
```

Examples of Semantics are as Follows:
num_regions indicate the number of 3D spatial regions in the G-PCC data file.
3d_region_id indicates the identifier of a spatial region.
anchor_x, anchor_y, and anchor_z indicate the x, y, and z offsets of the anchor point of the 3D spatial region, respectively, in cartesian coordinates.
region_dx, region_dy and region_dz indicate the size of the 3D spatial region in Cartesian coordinates along the x, y, and z axes, respectively, relative to the anchor point and indicates the width, height, and depth of the 3D spatial region in the Cartesian coordinates.
num_tiles indicate the number of 3D tiles associated with the 3D spatial region.
tile_id indicate the tile identifier of a 3D tile associated with the 3D spatial region.

A G-PCC Tile Information Item Property May be Described as Follows.
Box type: 'gpti'
Property type: Descriptive item property
Container: ItemPropertyContainerBox
Mandatory (per item): Yes, for an item of type 'gpt1'
Quantity (per item): One, for an item of type 'gpt1'

The GPCCTileInfoProperty descriptive item property describes tile identifiers of 3D tiles present in a G-PCC tile item. GPCCTileInfoProperty item property may optionally contain an anchor point and a size of the 3D tile in cartesian coordinates along the X, Y, Z axes relative to the anchor point of all the 3D tiles present in the G-PCC tile item.

An Example of Syntax is as Follows:

```
aligned(8) class GPCCTileInfoProperty
extends ItemFullProperty('gpti', version = 0, flags = 0)
{
   unsigned int(8) num_tiles;
   for(int j=0; j < num_tiles; j++){
      unsigned int(16) tile_id;
      unsigned int(1)    tile_inventory_info_flag;
      bit(7)             reserved = 0;
      if(tile_inventory_info_flag)
         3DSpatialRegionStruct(1);
   }
}
```

An Example of Semantics is as Follows:
num_tiles indicate the number of 3D tiles present in a G-PCC tile item.
tile_id indicate the tile identifier of a 3D tile present in the G-PCC tile item.
tile_inventory_info_flag indicates whether tile inventory information is available in the GPCCTileInfoProperty property is available. Value 0 indicates the tile inventory information is not available in GPCCTileInfoProperty property. Value 1 indicates the tile inventory information is available in GPCCTileInfoProperty property.

3d_region_id indicates the identifier of a 3D tile.

anchor_x, anchor_y, and anchor_z indicate the x, y, and z offsets of the anchor point of the 3D tile, respectively, in cartesian coordinates.

region_dx, region_dy and region_dz indicate the size of the 3D tile in Cartesian coordinates along the x, y, and z axes, respectively, relative to the anchor point and indicates the width, height, and depth of the 3D tile in Cartesian coordinates.

In another embodiment, temporal scalability in the G-PCC data file may be supported by dividing the G-PCC frames based on the temporal layers. The system may select the maximum number of temporal layers to be present in the G-PCC data file to support temporal scalability. The system may distribute the G-PCC frames in the data file to multiple temporal layers. For example, a G-PCC data file containing 600 frames may be distributed into 3 temporal layers with the first frame assigning to temporal layer 0, second frame assigning to temporal layer 1, third frame assigning to temporal layer 3, fourth frame assigning to temporal layer 0, and so forth. If the mapping between the G-PCC frame and the temporal layer identifier information is not signaled in the G-PCC data file, the distribution logic of a G-PCC frame to a specific temporal layer may be identified by the system. A G-PCC streaming application may stream only a specific temporal layer ID frames, frames belonging to multiple temporal layers or all the temporal layers frames followed by decoding and rendering of those frames to the point cloud renderer. Frames of an individual temporal layer of a plurality of identified temporal layers may be decoded and rendered without decoding and rendering any other temporal layers.

In another embodiment, a GPCCScalabilityInfoBox box indicates the scalability information present in the data file. When this box is present in a sample entry of tracks representing the main G-PCC data, the box indicates whether the scalability is supported. If scalability is supported, this box provides the maximum number of temporal layers present in the G-PCC data file.

In another embodiment, a G-PCC tile base track or the main track signals the maximum number of temporal layers present in the G-PCC data file.

An Example of Syntax for GPCCScalabilityInfoBox is as Follows:

```
aligned(8) class GPCCScalabilityInfoBox
    extends FullBox('gsci', version = 0, 0) {
    unsigned int(1) temporal_scalability_flag;
    bit(7)      reserved = 0;
    if(temporal_scalability_flag) {
        unsigned int(16) max_num_temporal_layers;
        for(i=0; i < num_temporal_layers; i++){
            unsigned int(16) temporal_layer_id;
        }
    }
}
```

An Example of Semantics of GPCCScalabilityInfoBox is as Follows temporal_scalability_flag indicates whether the G-PCC frames in the data file are divided into temporal layers. Value 0 indicates temporal layer information is not available or all the temporal layers frames are signalled in one temporal layer. Value 1 indicates the frames are divided into multiple temporal layers.

max_num_temporal_layers indicates the maximum number of temporal layers the G-PCC data file frames are divided into.

temporal_layer_id indicates a temporal layer identifier of the samples present.

In another embodiment, a G-PCC tile track may signal the temporal layer identifier(s) of the G-PCC samples present in that track. The temporal layer identifier information present in a tile track is signaled in GPCCTileSampleEntry. A G-PCC tile track may signal one or more tiles belonging to one or more temporal layers or all temporal layers.

A sample entry describes media samples of a G-PCC component tile track. GPCCTileSampleEntry is described as follows:

Sample Entry Type: 'gpt1'
Container: Sample Description Box ('stsd')
Mandatory: No
Quantity: Zero or one sample entry may be present An Example of Syntax for GPCCTileSampleEntry is as Follows:

```
aligned(8) class GPCCTileSampleEntry
    extends VolumetricVisualSampleEntry ('gpt1') {
    unsigned int(1) dynamic_tile_id_flag;
    unsigned int(1) temporal_scalability_flag;
    bit(6) reserved = 0;
    unsigned int(16) max_num_tile_ids_in_track;
    for(i=0; i < max_num_tile_ids_in_track; i++){
        unsigned int(16) tile_id;
    }
    if(temporal_scalability_flag)
    {
        unsigned int(16) num_temporal_layers;
        for(i=0; i < num_temporal_layers; i++){
            unsigned int(16) temporal_layer_id;
        }
    }
    GPCCComponentTypeBox type; // optional
    GPCCTileConfigurationBox config; // optional
}
```

Semantics of the Fields in GPCCTileSampleEntry May be Described as Follows:

compressorname in the base class VolumetricVisualSampleEntry indicates the name of the compressor used with the value "1013GPCC Coding" being recommended; the first byte is a count of the remaining bytes, here represented by 1013, which (being octal 13) is 11 (decimal), the number of bytes in the rest of the string.

config is a G-PCC Tile group configuration record information.

type is an instance of the GPCCComponentTypeBox, which indicates the type of the G-PCC component carried in the respective track. When all the components' data is carried together this box is not present.

dynamic_tile_id_flag indicates whether the number of tiles or the tile identifiers present in a tile track sample are changing dynamically in the stream. Value 0 indicates all the samples in a tile track contains the same number of tiles and the tile identifiers of those tiles are not changing. Value 1 indicates the number of tiles present in the tile track samples is changing or the tile identifiers in the tile track samples are changing in the stream.

temporal_scalability_flag indicates whether the G-PCC frames in the data file are divided into temporal layers. Value 0 indicates temporal layer information is not available or all the temporal layers frames are signalled in this tile track. Value 1 indicates the temporal layer identifier information is present.

max_num_tile_ids_in_track indicates the maximum number of unique G-PCC tile identifiers present in the samples of the respective track. When dynamic_num_tiles_flag is 0, each sample in a tile track contains max_num_tile_ids_in_track number of tiles and the tile identifiers of those tiles are not changing in the stream. When dynamic_num_tiles_flag is 1, each sample in the tile track contains at most max_num_tile_ids_in_track number of tiles and the tile identifiers of those tiles may change between samples.

tile_id indicates an identifier for a particular G-PCC tile corresponding to samples in the respective track.

num_temporal_layers indicates the number of temporal layers present in the samples of the respective track.

temporal_layer_id indicates a temporal layer identifier of the samples signaled in the respective track.

A sample entry of G-PCC tile base track or G-PCC geometry track may contain the GPCCScalabilityInfoBox box. The sample entry of G-PCC tile base track is as follows:

```
aligned(8) class GPCCSampleEntry( )
    extends VolumetricVisualSampleEntry ('gpcb' or 'gpeb') {
    GPCCConfigurationBox config;
    // optional boxes
    GPCCScalabilityInfoBox    scalabilityInfo;
}
```

The sample entry of G-PCC geometry track is as follows:

```
aligned(8) class GPCCSampleEntry( )
    extends VolumetricVisualSampleEntry ('gpc1' or 'gpcg') {
    GPCCConfigurationBox config;
    GPCCComponentInfoBox    type;
    // optional boxes
    GPCCScalabilityInfoBox scalabilityInfo;
}
```

In another embodiment, a G-PCC track of type 'gpe1' or 'gpeg' may signal the temporal layer identifier(s) of the G-PCC samples present in that track. A GPCCScalabilityInfoBox box may be present in the sample entry to signal the temporal layer identifiers information present in that track. A G-PCC track of type 'gpe1' or 'gpeg' may signal all the temporal layers present in the data file.

A sample entry of a G-PCC track for single track case is shown below.

```
aligned(8) class GPCCSampleEntry
    extends VolumetricVisualSampleEntry ('gpe1' or 'gpeg') {
    GPCCConfigurationBox config;   //mandatory
    GPCCScalabilityInfoBox    scalabilityInfo; //optional
}
``` scalabilityInfo indicates the temporal scalability layer identifiers information present in the samples of this track.

The presentation time of samples present in different temporal level tracks belonging to the same point cloud component shall be different. For example, the presentation time of geometry component samples present in temporal level 0 and temporal level 1 tracks shall be different.

The GPCCDecoderConfigurationRecord as described in ISO/IEC 23090-18 may be extended to indicate the number of temporal layers present in the data file. The syntax and semantics of the extended decoder configuration record are shown below. The decoder configuration information, such as SPS, GPS, APS and Tile Inventory information, for all the temporal level tracks may advantageously be the same. Advantageously, only the number of temporal levels and the temporal level identifiers present in those tracks may be changed.

Example Syntax is as Follows:

```
aligned(8) class GPCCDecoderConfigurationRecord {
    unsigned int(8)     configurationVersion = 1;
    unsigned int(8)     profile_idc;
    unsigned int(24)    profile_compatibility_flags;
    unsigned int(8)     level_idc;
    unsigned int(8)     numOfSetupUnits;
    for (i=0; i<numOfSetupUnits; i++) {
        tlv_encapsulation    setupUnit;    //as defined in ISO/IEC
            23090-9
    }
    unsigned int(8)     num_temporal_layers;
    for(i=0; i < num_temporal_layers; i++){
        unsigned int(16) temporal_layer_id;
    }
    // additional fields
}
```

Example Semantics are as Follows:

num_temporal_layers indicates the maximum number of temporal layers present in the track. When the temporal layer information is not available or all the frames are signalled in one temporal layer this filed value is 1.

temporal_layer_id indicates a temporal layer identifier.

In another embodiment, the samples of a G-PCC component are grouped based on the temporal level of the sample. The temporal level sample grouping ('tele') provides a codec-independent sample grouping that may be used to group G-PCC samples in a track (and potential track fragments) according to temporal level, where samples of one temporal level have no coding dependencies on samples of other temporal levels.

In another embodiment, the temporal level sample group 'tele' specified in ISO/IEC 14496-12 is used to indicate a TemporalId value. When the 'tele' sample group is present in a G-PCC tracks that carry geometry and/or attribute data, the sample with temporal level TemporalId is mapped to the sample group description index TemporalId+1. The sample group description box signals the sample group descriptions for all the layers signalled in the decoder configuration record.

In another embodiment, when the tile inventory information is available in the G-PCC data file and is static or changing over time, the tile inventory information is signaled using tile inventory information sample group with a grouping_type 'gtii'. The tile inventory information sample group with grouping type 'gtii' is used to group the G-PCC samples that use the same tile inventory information in a G-PCC geometry track. The tile inventory information may be present in the sample group description entry or in the samples.

In another embodiment, when the G-PCC data file is carried using G-PCC tracks with track type 'gpc1' and the tile inventory information is available in the data file, the geometry track contains the tile inventory information sample group with grouping type 'gtii' and the tile inventory information is present in the sample group description entry. The attribute tracks do not contain the sample group with grouping type 'gtii'.

In another embodiment, under the 'gpcg' sample entry when the tile inventory information is available in the data file, the geometry track contains the tile inventory information sample group with grouping type 'gtii' and tile inventory information may be present in the sample group description entry or in the samples of G-PCC geometry track.

In another embodiment, under the 'gpe1' sample entry when the tile inventory information is available in the data file, the G-PCC track contains the tile inventory information sample group with grouping type 'gtii' and the tile inventory information is present in the sample group description entry.

In another embodiment, under the 'gpeg' sample entry, when the tile inventory information is available in the data file, the G-PCC track contains the tile inventory information sample group with grouping type 'gtii' and the tile inventory information may be present in the sample group description entry or in the samples of G-PCC track.

In another embodiment, when the G-PCC data file is carried using tile tracks, tile base track with track type 'gpcb' or 'gpeb' may contain the sample group with grouping type 'gtii' and the tile inventory information is available in the tile base track samples. The tile inventory information is not present in the in the 'gtii' sample group description entry. The geometry and attribute tile tracks with track type 'gpt1' do not contain the sample group with grouping type 'gtii'.

In another embodiment, when the G-PCC data file is carried using tile tracks with track type 'gpt1', geometry tile tracks may contain the 'gtii' sample group to signal the tile inventory information of tiles present in the samples of that track.

Tile Inventory Information Sample Group Entry:
Group Types: 'gtii'
Container: Sample Group Description Box ('sgpd')
Mandatory: No
Quantity: Zero or more A tile inventory sample group entry describes the tile inventory information for all the samples that use the same tile inventory information.

An Example of Syntax is as Follows:

```
abstract class SampleGroupDescriptionEntry (unsigned int(32)
grouping_type)
{
}
abstract class VolumetricSampleGroupEntry (unsigned int(32)
grouping_type) extends
SampleGroupDescriptionEntry (grouping_type)
{
}
class TileInventoryInfoEntry( ) extends VolumetricSampleGroupEntry
('gtii')
{
    tlv_encapsulation tile_inventory_info; //as defined in ISO/IEC
    23090-9
}
```

An Example of Semantics is as Follows:
tile_inventory_info contains tile inventory information TLV encapsulation structure of tlv_type equal to 5 as described in ISO/IEC 23090-9.

For example, a G-PCC data file with multiple tile tracks has one geometry component and two attribute components. In this example, the G-PCC data file contains 50 tiles that are grouped into ten tile sets. The first tile set may include tiles 1 to 5, the second tile set may include tiles 6 to 9, the third tile set may include tiles 10 to 20, and so forth. The number of tiles in each set may vary between sets or may be the same number. Each component for a tile set is carried in a separate G-PCC tile track in the ISOBMFF container file.

When the client wants to playback the G-PCC content with a specific 3D region(s) of interest, the client identifies the 3D regions present in the G-PCC data file from the GPCCSpatialRegionInfoBox present in the G-PCC base track. The client selects the tiles associated with the 3D region(s) of interest. The client identifies the required tile tracks for the selected tiles based on the tile information present in each tile track GPCCTileSampleEntry. The GPCCTileSampleEntry specifies the list of tiles present in that tile track.

When the G-PCC tiled media content is present, the client identifies the tiles of interest in the point cloud data file based on the client's current viewport. The client parses the GPCCSpatialRegionInfoBox present in the G-PCC base track and finds the respective 3D regions present in the current viewport. The tiles that are within those selected 3D regions are identified using the GPCCSpatialRegionInfoBox. The client identifies the required tile tracks for the selected tiles based on the tile information present in each tile track GPCCTileSampleEntry.

When the 3D region information or the tiles present in a 3D region are dynamically changing in the G-PCC content, and the client wants to playback the G-PCC content with a 3D region(s) of interest, the client identifies the dynamically changing 3D regions present in the G-PCC data file from the Dynamic3DSpatialRegionSampleEntry in the timed meta-data track with a sample entry type 'gpdr'. The client identifies the tiles present in the 3D region(s) of interest using the Dynamic3DSpatialRegionSample type sample present in the timed meta-data track. The client identifies the required tile tracks for the selected tiles based on the tile information present in each tile track GPCCTileSampleEntry.

The client may also access the tile tracks data based on the user viewport. When the 3D partitions present in the user viewport are dynamic, the client identifies that dynamically changing 3D regions are present in the G-PCC data file from the Dynamic3DSpatialRegionSampleEntry presence in timed meta-data track with a sample entry type 'gpdr'. The client identifies the 3D region(s) present in the viewport using the Dynamic3DSpatialRegionSample type sample present in the timed meta-data track. The client identifies the tiles present in those selected 3D regions using the information available in the Dynamic3DSpatialRegionSample sample. The client identifies the required tile tracks for the selected tiles based on the tile information present in each tile track GPCCTileSampleEntry box.

The following is an example client method for playback of G-PCC tiled content.

1. Identify the client interested viewport or user viewport information;
2. Identify the 3D regions associated with the client interested or user viewport using GPCCSpatialRegionInfoBox;
3. When the 3D regions information is changing dynamically, identify the 3D regions information present in the 3D spatial region information timed meta-data track sample of type Dynamic3DSpatialRegionSample;
4. Based on the available 3D regions information, identify the 3D regions associated with the interested viewport region, for example, for 3D dynamically changing regions;

5. Identify the tiles associated with those interested 3D regions from the 3D spatial region information timed meta-data track sample;
6. Identify the tile tracks associated with those selected tiles using the information in GPCCTileSampleEntry box present in each tile track;
7. The selected tile track streams are extracted from the G-PCC data file or bitstream, decoded and present to the user based on the user current viewport or interested viewport.

When the client wants to playback the G-PCC content with 3D object(s) of interest, the client identifies 3D objects present in the G-PCC data file from the GPCC3DObjectsInfoBox present in the G-PCC base track. The client selects the tiles to be downloaded for the 3D object(s) of interest. The client identifies the required tile tracks for the selected tiles based on the tile information present in each tile track GPCCTileSampleEntry. The GPCCTileSampleEntry specifies the list of tiles present in that tile track.

When the 3D objects bounding box information or the tiles present in a 3D object are dynamically changing, and the client wants to playback the G-PCC content with 3D object(s) of interest, the client identifies the dynamically changing 3D objects present in the G-PCC data file from the Dynamic3DObjectsInfoSampleEntry in the timed meta-data track with a sample entry type 'gpdo'. The client identifies the tiles present in the 3D object(s) of interest using the Dynamic3DObjectsInfoSample type sample present in the 3D objects timed meta-data track. The client identifies the required tile tracks for the selected tiles based on the tile information present in each tile track GPCCTileSampleEntry.

The following is an example client method for playback of G-PCC tiled content.
1. Identify the user interested 3D objects and viewport information;
2. Identify the tiles associated with 3D objects of interest using GPCC3DObjectsInfoBox;
3. When the 3D objects spatial information is changing dynamically, identify the tiles associated with the interested 3D objects using the information present in the 3D object information timed meta-data track sample of type Dynamic3DObjectsInfoSample;
4. Identify the tile tracks associated with those selected tiles using the information in GPCCTileSampleEntry box present in each tile track;
5. For the interested viewport display, identify the 3D regions associated with the interested or user viewport using GPCCSpatialRegionInfoBox;
6. When the 3D region information is changing dynamically, identify the 3D region information present in the 3D spatial region information timed meta-data track sample of type Dynamic3DSpatialRegionSample;
7. Based on the available 3D regions information, identify the 3D regions associated with the interested viewport region, for example, for 3D dynamically changing regions;
8. Identify the tiles associated with the interested 3D regions from the 3D spatial region information timed meta-data track sample;
9. Identify the tile tracks associated with the selected tiles using the information in GPCCTileSampleEntry box present in each tile track;
10. The selected tile track streams from step 4 and step 9 are extracted from the G-PCC data file or bitstream, decoded, and presented to the user based on the user's 3D objects of interest and current viewport or interested viewport.

An alternative method comprises receiving a timed-metadata track identifying point cloud tiles corresponding to one or more spatial regions within a point cloud scene. A decoding device determines one or more point cloud tiles to be used for rendering an image. One or more geometry tile tracks are retrieved, via a communications network, corresponding to the determined one or more point cloud tiles. Each geometry tile track comprises point cloud geometry data for a respective tile. The retrieved geometry tile tracks are processed. The timed-metadata track may be a track with a Dynamic3DSpatialRegionSampleEntry data field or a GPCCSpatialRegionInfoBox box data field. The determination of tiles to be used for rendering an image may comprise obtaining a viewing angle of a viewer device with respect to the point cloud data. The decoding device may be a player device or a streaming client, and determining one or more point clouds may comprise identifying the set of tile tracks carrying information needed to render certain spatial regions or tiles within the point cloud scene. A base track may carry initialization data including at least one of (i) type-length-value encapsulation structures containing only SPS, GPS, APS, (ii) tile inventory information as described in ISO/IEC 23090-9. The base track may be linked to the geometry tile tracks in accordance with a track reference type using a four-character code (4CC). Each geometry tile track may be linked with one or more attribute tile tracks. The geometry tile tracks may be associated with attribute tile tracks that carry attribute information of the respective tile or tile group using the track reference tool of ISO/IEC 14496-12. Multiple tiles and corresponding tile data may be carried in multiple geometry tile tracks and multiple attribute tile tracks. A base track may use a GPCCSampleEntry data field with a sample entry type of 'gpcb'. GPCC component tile tracks that have a same alternate_group value are different encoded versions of the same G-PCC component, and G-PCC component tile tracks that are alternatives may have a same alternate_group value, for example, in their TrackHeaderBox. The G-PCC component tile tracks that belong to an alternative group may be referenced by the G-PCC base track or a respective G-PCC geometry tile track. G-PCC attribute tracks that are alternatives of each other may have a same alternate_group value. G-PCC attribute tile tracks that are alternatives of each other may have a same alternate_group value.

A method of generating a point cloud data stream comprises generating a base track sample entry containing a GPCCConfigurationBox in one embodiment.

A method of generating a point cloud data stream comprises carrying a basetrack sample entry as part of G-PCC sample described in ISO/IEC 23090-18 in one embodiment.

In one embodiment, a method comprises receiving a timed-metadata track identifying point cloud tiles corresponding to one or more spatial regions within a point cloud scene, determining, at a decoding device, one or more point cloud tiles to be used for rendering an image, retrieving from a communications network one or more geometry tile tracks corresponding to the determined one or more point cloud tiles, each geometry tile track comprising point cloud geometry data for a respective tile, and processing the retrieved geometry tile tracks. A set of tile tracks carrying information needed to render certain spatial regions or tiles within the point cloud scene may be identified. Each geometry tile track may be linked with one or more attribute tile tracks. When a data file is carried using tile tracks, a tile base track may contain tile inventory information in tile base track samples, and a geometry tile track contains a sample group to signal tile inventory of tiles present in samples of the geometry tile track. When a data file is carried using single track or multiple tracks with each track carrying a component data, the track carrying geometry data may contain a sample group to signal the tile inventory information. The G-PCC component tile tracks that belong to an alternative group may be referenced by the G-PCC base track or a respective G-PCC geometry tile track. The method may further comprise receiving a formatted container including geometry-based point cloud data comprising the one or more point cloud tiles; obtaining the timed meta data track from the formatted container, wherein the timed meta data track comprises a plurality of tile identifiers, wherein each tile identifier corresponds to a respective tile of the one or more point cloud tiles; selecting at least one selected tile from the one or more point cloud tiles, wherein the at least one selected tile corresponds to at least one tile identifier; identifying at least one geometry tile track associated with the at least one tile identifier; utilizing a first track reference type associated with the at least one geometry tile track, identifying a base track including initialization data for the at least one selected tile; and decoding the at least one selected tile utilizing the at least one geometry tile track and the initialization data into at least one decoded tile. The method may further comprise identifying at least one attribute tile track associated with the at least one selected tile; wherein decoding the at least one selected tile comprises utilizing the at least one geometry tile track, the at least one attribute tile track, and the initialization data into the at least one decoded tile. Decoding may be performed without decoding all of the geometry-based point cloud data. The method may further comprise: identifying a viewport for a client; identifying at least one 3D region associated with the viewport; when information for the at least one 3D region is changing dynamically, identifying the information for the at least one 3D region present in a 3D spatial region information timed meta-data track sample; based on available 3D regions information, identifying which of the at least one 3D region is associated with the viewport; identifying at least one tile associated with at least one 3D region of interest from the 3D spatial region information timed meta-data track sample; identifying at least one tile track associated with the at least one tile associated with at least one 3D region of interest by using information present in each tile track; extracting the identified tile tracks from a G-PCC data file, decoding the identified tile tracks, and displaying the decoded tile tracks based on a current viewport or the viewport. The timed-metadata track may set a sample as either a sync sample or a non-sync sample, wherein non-sync samples in the timed meta data track carry only updated 3D spatial region information with reference to 3D spatial region information available in a nearest preceding sync sample, and wherein non-sync samples in the timed meta data track signal only updated 3D spatial region information with reference to 3D spatial region information available in a nearest preceding sync sample, including dimensions or associated 3D tiles that are updated as well as any added or cancelled 3D spatial regions. Different encoded versions of a cloud tile may be signalled using multiple tile base tracks and have a same group identification, for example one group identification. Different encoded versions of an attribute component cloud tile may be signalled using a same group identification. Frames of the point cloud data may be distributed among a plurality of identified temporal layers, and wherein each frame is assigned to one of the plurality of identified temporal layers, and wherein a geometry tile track signals at least one temporal layer identifier of G-PCC samples present in the geometry tile track, and wherein samples of a G-PCC component of a geometry tile track are grouped based on temporal level of each sample. Frames of an individual temporal layer of the plurality of identified temporal layers may be decoded and rendered without decoding and rendering any other temporal layers. A non-transitory computer-readable storage medium having stored instructions that, when executed by a processor, may cause the processor to perform the method. An apparatus comprises at least one processor; and at least one memory having stored instructions operative, when executed by the at least one processor, to cause the apparatus to receive a timed-metadata track identifying point cloud tiles corresponding to one or more spatial regions within a point cloud scene, determine, at a decoding device, one or more point cloud tiles to be used for rendering an image, retrieve from a communications network one or more geometry tile tracks corresponding to the determined one or more point cloud tiles, each geometry tile track comprising point cloud geometry data for a respective tile; and process the retrieved geometry tile tracks.

A method comprises using a presentation time of a sample to identify a G-PCC base track sample (carrying parameter set and tile inventory data) required to decode the G-PCC tile in one embodiment. A corresponding base track sample's presentation time may be either equal to or less than the tile track sample presentation time. When the presentation time of the base track and tile track samples do not match, the tile track sample is decoded or the sample's tile inventory information is identified using the base track sample with a presentation time closer to the presentation time of the tile track sample.

The selected tile may be encoded such that the selected tile is decodable without decoding the entire formatted container. The base track may include parameter set and tile inventory data. A base track sample that decodes a tile track sample may be identified using a presentation time of a corresponding sample. The geometry-based point cloud data may comprise a plurality of geometry-based point cloud compression (G-PCC) units, wherein each G-PCC unit comprises a G-PCC type-length-value and a G-PCC payload. A non-transitory computer readable medium may comprise computer-readable instructions configured to perform any of the methods described above.

In one embodiment, a method comprises receiving a formatted container including geometry-based point cloud data comprising a plurality of tiles, and obtaining a timed meta data track from the formatted container, wherein the timed meta data track comprises a plurality of tile identifiers, wherein each tile identifier corresponds to a respective tile of the plurality of tiles. At least one selected tile is selected from the plurality of tiles, wherein the at least one selected tile corresponds to at least one tile identifier. At least one geometry tile track associated with the at least one tile identifier is identified. Utilizing a first track reference type associated with the at least one geometry tile track, a base track including initialization data for the at least one selected tile is identified. The at least one selected tile is decoded utilizing the at least one geometry tile track and the initialization data into at least one decoded tile. The method may further comprise, utilizing a second track reference type associated with the at least one geometry tile track, identifying at least one attribute tile track associated with the at least one selected tile; wherein decoding the at least one selected tile comprises utilizing the at least one geometry tile track, the at least one attribute tile track, and the initialization data into the at least one decoded tile. The decoding may be performed without decoding all of the geometry-based point cloud data. When tile inventory information is available in a data file, the tile inventory information may be signaled using a tile inventory information sample group that groups samples with a same tile inventory information in a geometry track. When tile inventory information is available in a data file, a geometry track may contain a tile inventory information sample group type, wherein the tile inventory information is present in a sample group description or in samples in the geometry track. When a data file is carried using tile tracks, a tile base track may contain tile inventory information in tile base track samples. When a data file is carried using tile tracks, a geometry tile track may contain a sample group to signal tile inventory of tiles present in samples of the geometry tile track.

In one embodiment, a method comprises identifying a viewport for a client, identifying at least one 3D region associated with the viewport, and, when information for the at least one 3D region is changing dynamically, identifying the information for the at least one 3D region present in a 3D spatial region information timed meta-data track sample; and based on available 3D regions information, identifying which of the at least one 3D region is associated with the viewport. At least one tile associated with at least one 3D region of interest from the 3D spatial region information timed meta-data track sample is identified. At least one tile track associated with the at least one tile associated with at least one 3D region of interest is identified by using information present in each tile track. The identified tile tracks are extracted from the G-PCC data file, the identified tile tracks are decoded, and the decoded tile tracks are displayed based on a current viewport or the viewport. The timed-metadata track may set a sample as either a sync sample or a non-sync sample. The sample may be present for a specific number of samples. The sample may be present for a specific time interval. Non-sync samples in the timed meta data track may carry only updated 3D spatial region information with reference to 3D spatial region information available in a nearest preceding sync sample. Non-sync samples in the timed meta data track may signal only updated 3D spatial region information with reference to 3D spatial region information available in a nearest preceding sync sample, including dimensions or associated 3D tiles that are updated as well as any added or cancelled 3D spatial regions. A dynamic tile ID flag may indicate whether associated tiles of a 3D spatial region in a current sample are updated with reference to a preceding sync sample. An indication of a number of updated 3D spatial regions signalled in a current sample with reference to a previous sync sample may be included. The timed-metadata track may include a 3D region identifier, an offset, and a size of bounding box information for each 3D region.

In one embodiment, a method comprises identifying a 3D object of interest and viewport information; identifying the tiles associated with the 3D object of interest; when spatial information for the 3D object is changing dynamically, identifying at least one tile associated with the 3D object of interest by using information present in a 3D object information timed meta-data track sample; and identifying at least one tile track associated with the at least one tile using the information present in each tile track. For a viewport, 3D regions associated with the viewport information are identified. When information for the 3D region is changing dynamically, the 3D region information present in a 3D spatial region information timed meta-data track sample is identified. Based on available 3D region information, the 3D regions associated with a viewport region are identified. The tiles associated with the 3D region of interest from the 3D spatial region information timed meta-data track sample are identified. At least one tile track associated with the identified tiles using information present in each tile track is identified. The at least one tile track stream is extracted from the G-PCC data file, decoding the at least one tile track stream, and displaying the decoded tile tracks based on a current viewport or the viewport. The viewport may be an interested viewport.

A method comprises receiving an item and an associated spatial region property item identifying point cloud tiles corresponding to one or more spatial regions within a point cloud scene, determining, at a decoding device, one or more point cloud tiles to be used for rendering a frame of the point cloud scene, and retrieving from a communications network one or more tile items corresponding to the determined one or more point cloud tiles, each tile item comprising point cloud geometry data for a respective tile. The retrieved tile items are processed. An tile item containing a tile of the point cloud tiles is identified by interpreting an associated spatial region image property and an associated tile information item property, wherein at least some of the one or more point cloud tiles are stored in separate image items. The image item may be associated with a tile information item property or a sub-sample information item property suitable to indicate an identifier of tiles that are contained within a point cloud tile. Spatial region item properties and tile information item properties may facilitate partial access to non-timed cloud tile data. Each tile item may further comprise attributes data.

A method comprises receiving a timed-metadata track identifying point cloud tiles corresponding to one or more spatial regions within a point cloud scene, determining, at a decoding device, one or more point cloud tiles to be used for rendering an image, and retrieving from a communications network one or more geometry tile tracks corresponding to the determined one or more point cloud tiles, each geometry tile track comprising point cloud geometry data for a respective tile. The retrieved geometry tile tracks are processed. Different encoded versions of a cloud tile are signalled in one tile base track and have a same group identification.

In one embodiment, a method comprises receiving a timed-metadata track identifying point cloud tiles corresponding to one or more spatial regions within a point cloud scene; determining, at a decoding device, one or more point cloud tiles to be used for rendering an image, and retrieving from a communications network one or more geometry tile tracks corresponding to the determined one or more point cloud tiles, each geometry tile track comprising point cloud geometry data for a respective tile. The retrieved geometry tile tracks are processed. Different encoded versions of a cloud tile may be signalled in one tile base track and may have a same group identification. Frames of the point cloud data may be distributed among a plurality of identified temporal layers, and each frame may be assigned to one of the plurality of identified temporal layers. Frames of an individual temporal layer of the plurality of identified temporal layers may be decoded and rendered without decoding and rendering any other temporal layers. A maximum number of temporal layers present in a data file including the timed-metadata track may be identified in the data file. A geometry tile track may signal at least one temporal layer identifier of G-PCC samples present in the geometry tile track. A samples of a G-PCC component of a geometry tile track may be grouped based on temporal level of each sample.

Although features and elements are described above in particular combinations, one of ordinary skill in the art will appreciate that each feature or element can be used alone or in any combination with the other features and elements. In addition, the methods described herein may be implemented in a computer-readable instructions, a computer program, software, or firmware incorporated in a computer-readable medium for execution by a computer or processor. A computer-readable medium may be a non-transitory storage medium. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a wireless transmit/receive unit (WTRU), user equipment (UE), terminal, base station, radio network controller (RNC), or any host computer.

What is claimed is:

1. A method comprising:
receiving a timed-metadata track identifying point cloud tiles corresponding to one or more spatial regions within a point cloud scene of a geometry-based point cloud compression (G-PCC) data file;
determining, at a decoding device, one or more point cloud tiles to be used for rendering an image;
retrieving from a communications network one or more geometry tile tracks corresponding to the determined one or more point cloud tiles, each geometry tile track comprising point cloud geometry data for a respective tile; and
processing the retrieved geometry tile tracks.

2. The method of claim 1, further comprising identifying a set of tile tracks carrying information needed to render certain spatial regions or tiles within the point cloud scene.

3. The method of claim 1, wherein each geometry tile track is linked with one or more attribute tile tracks.

4. The method of claim 1, wherein, when a data file is carried using tile tracks: a tile base track contains tile inventory information in tile base track samples, and a geometry tile track contains a sample group to signal tile inventory of tiles present in samples of the geometry tile track.

5. The method of claim 1, wherein G-PCC component tile tracks that belong to an alternative group are referenced by a G-PCC base track or a respective G-PCC geometry tile track.

6. The method of claim 1, further comprising:
receiving a formatted container including geometry-based point cloud data comprising the one or more point cloud tiles;
obtaining the timed meta data track from the formatted container,
wherein the timed meta data track comprises a plurality of tile identifiers,
wherein each tile identifier corresponds to a respective tile of the one or more point cloud tiles;
selecting at least one selected tile from the one or more point cloud tiles,
wherein the at least one selected tile corresponds to at least one tile identifier;
identifying at least one geometry tile track associated with the at least one tile identifier;
utilizing a first track reference type associated with the at least one geometry tile track;
identifying a base track including initialization data for the at least one selected tile; and
decoding the at least one selected tile utilizing the at least one geometry tile track and the initialization data into at least one decoded tile.

7. The method of claim 6, further comprising:
identifying at least one attribute tile track associated with the at least one selected tile;
wherein decoding the at least one selected tile comprises utilizing the at least one geometry tile track, the at least one attribute tile track, and the initialization data into the at least one decoded tile.

8. The method of claim 6, wherein decoding is performed without decoding all of the geometry-based point cloud data.

9. The method of claim 1, further comprising:
identifying a viewport for a client;
identifying at least one 3D region associated with the viewport;
when information for the at least one 3D region is changing dynamically, identifying the information for the at least one 3D region present in a 3D spatial region information timed meta-data track sample;
based on available 3D regions information, identifying which of the at least one 3D region is associated with the viewport;
identifying at least one tile associated with at least one 3D region of interest from the 3D spatial region information timed meta-data track sample;
identifying at least one tile track associated with the at least one tile associated with at least one 3D region of interest by using information present in each tile track; and
extracting the identified tile tracks from a G-PCC data file, decoding the identified tile tracks, and displaying the decoded tile tracks based on a current viewport or the viewport.

10. The method of claim 1,
wherein the timed-metadata track sets a sample as either a sync sample or a non-sync sample,
wherein non-sync samples in the timed meta data track carry only updated 3D spatial region information with reference to 3D spatial region information available in a nearest preceding sync sample, and
wherein non-sync samples in the timed meta data track signal only updated 3D spatial region information with reference to 3D spatial region information available in a nearest preceding sync sample, including dimensions or associated 3D tiles that are updated as well as any added or cancelled 3D spatial regions.

11. The method of claim 1, wherein different encoded versions of a cloud tile are signaled using multiple tile base track and have a same group identification.

12. The method of claim 1,
wherein frames of the point cloud data are distributed among a plurality of identified temporal layers,
wherein each frame is assigned to one of the plurality of identified temporal layers,
wherein a geometry tile track signals at least one temporal layer identifier of G-PCC samples present in the geometry tile track, and
wherein samples of a G-PCC component of a geometry tile track are grouped based on temporal level of each sample.

13. The method of claim 12, wherein frames of an individual temporal layer of the plurality of identified temporal layers are decoded and rendered without decoding and rendering any other temporal layers.

14. The method of claim 1,
wherein the timed-metadata track sets a sample as either a sync sample or a non-sync sample, and
wherein non-sync samples in the timed meta data track signal only updated 3D spatial region information with reference to 3D spatial region information available in a nearest preceding sync sample, including dimensions or associated 3D tiles that are updated as well as any added or cancelled 3D spatial regions.

15. A non-transitory computer-readable storage medium having stored instructions that, when executed by a processor, cause the processor to perform:
receiving a timed-metadata track identifying point cloud tiles corresponding to one or more spatial regions within a point cloud scene of a geometry-based point cloud compression (G-PCC) data file;
determining, at a decoding device, one or more point cloud tiles to be used for rendering an image;
retrieving from a communications network one or more geometry tile tracks corresponding to the determined one or more point cloud tiles, each geometry tile track comprising point cloud geometry data for a respective tile; and
processing the retrieved geometry tile tracks.

16. An apparatus comprising:
at least one processor; and
at least one memory having stored instructions operative, when executed by the at least one processor, to cause the apparatus to:
receive a timed-metadata track identifying point cloud tiles corresponding to one or more spatial regions within a point cloud scene of a geometry-based point cloud compression (G-PCC) data file;
determine, at a decoding device, one or more point cloud tiles to be used for rendering an image;
retrieve from a communications network one or more geometry tile tracks corresponding to the determined one or more point cloud tiles, each geometry tile track comprising point cloud geometry data for a respective tile; and
process the retrieved geometry tile tracks.

* * * * *